United States Patent
Hattori et al.

(10) Patent No.: US 12,174,452 B2
(45) Date of Patent: Dec. 24, 2024

(54) MIRROR SUPPORT MECHANISM AND OPTICAL DEVICE

(71) Applicant: Mitsubishi Electric Corporation, Tokyo (JP)

(72) Inventors: Tomoya Hattori, Tokyo (JP); Takayuki Sakai, Tokyo (JP); Atsumu Oikawa, Tokyo (JP); Kouichi Takeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/273,551

(22) PCT Filed: Jan. 28, 2022

(86) PCT No.: PCT/JP2022/003272
§ 371 (c)(1),
(2) Date: Jul. 21, 2023

(87) PCT Pub. No.: WO2022/163804
PCT Pub. Date: Aug. 4, 2022

(65) Prior Publication Data
US 2024/0085663 A1    Mar. 14, 2024

(30) Foreign Application Priority Data

Jan. 29, 2021 (JP) .................. 2021-013160

(51) Int. Cl.
*G02B 7/183* (2021.01)
*G02B 23/02* (2006.01)
*G02B 23/16* (2006.01)

(52) U.S. Cl.
CPC ............. *G02B 7/183* (2013.01); *G02B 23/02* (2013.01); *G02B 23/16* (2013.01)

(58) Field of Classification Search
CPC ........ G02B 7/183; G02B 23/02; G02B 23/16; G02B 7/181; G02B 7/1821; G02B 7/1822
(Continued)

(56) References Cited

U.S. PATENT DOCUMENTS 4,813,644 A * 3/1989 Goldner ............... A47B 19/002
                                                        248/188.5
6,425,671 B1 * 7/2002 Adler .................. G02B 26/0825
                                                        359/872

(Continued)

FOREIGN PATENT DOCUMENTS

CN       102200623 A     9/2011
JP       2002-350699 A   12/2002
(Continued)

OTHER PUBLICATIONS

International Search Report and Written Opinion mailed on Apr. 19, 2022, received for PCT Application PCT/JP2022/003272, filed on Jan. 28, 2022, 8 pages including English Translation.

(Continued)

*Primary Examiner* — Tuyen Tra
*Assistant Examiner* — Rahman Abdur
(74) *Attorney, Agent, or Firm* — XSENSUS LLP

(57) ABSTRACT

A mirror support mechanism includes three first supporting members and three second supporting members. Each first supporting member includes a mirror supporting portion that is in contact with and support a corresponding one of three supported surfaces provided on the supported portion with rotational symmetry of 120 degrees around an optical axis, and two first beam portions connected to both sides of the mirror supporting portion. Each second supporting member includes a supporting portion to which ends of two first beam portions adjacent to each other are connected, the ends being not connected to the mirror supporting portion, and (Continued)

two second beam portions connected to both sides of the supporting portion, an end of the second beam portion not connected to the supporting portion being supported by a structure member provided on the rear side of the reflecting mirror.

20 Claims, 16 Drawing Sheets

(58) Field of Classification Search
USPC .......................................................... 359/871
See application file for complete search history.

(56) References Cited

U.S. PATENT DOCUMENTS

| | | | |
|---|---|---|---|
| 11,391,913 | B2 | 7/2022 | Hattori et al. |
| 2002/0176094 | A1 | 11/2002 | Petasch et al. |
| 2006/0145321 | A1 | 7/2006 | Fisher |
| 2010/0202071 | A1* | 8/2010 | Preumont ............... G02B 26/06 359/849 |
| 2022/0026667 | A1 | 1/2022 | Hattori et al. |
| 2022/0026668 | A1 | 1/2022 | Hattori et al. |

FOREIGN PATENT DOCUMENTS

| | | |
|---|---|---|
| JP | 2006-198763 A | 8/2006 |
| WO | 2020/122196 A1 | 6/2020 |
| WO | 2020/122197 A1 | 6/2020 |

OTHER PUBLICATIONS

Notice of Reasons for Refusal mailed on Feb. 28, 2023, received for JP Application 2022-578508, 6 pages including English Translation.
Decision to Grant mailed on May 9, 2023, received for JP Application 2022-578508, 4 pages including English Translation.

* cited by examiner

MIRROR SUPPORT MECHANISM AND OPTICAL DEVICE

CROSS-REFERENCE TO RELATED APPLICATION

The present application is based on PCT filing PCT/JP2022/003272, filed Jan. 28, 2022, which claims priority to JP 2021-013160, filed Jan. 29, 2021, the entire contents of each are incorporated herein by reference.

TECHNICAL FIELD

The present disclosure relates to a mirror support mechanism that supports a reflecting mirror and an optical device including the mirror support mechanism.

BACKGROUND ART

A structure member of an optical device such as an optical telescope used in the aerospace field or the astronomical science field is required to be lightweight and to have a low thermal expansion coefficient. The structural member having a high thermal expansion coefficient may be deformed beyond an allowable extent due to a temperature change. The structural member deformed beyond the allowable extent due to heat may cause the optical axis of an optical telescope, for example, to deviate from a specified direction, or cause the focal position of the optical telescope to deviate from a predetermined position.

In an optical device mounted on an artificial satellite, a reflecting mirror is supported by a complicated mechanism. Since the mechanism is complicated, at least one of time, effort, or cost is required more for fabricating. A mirror support mechanism and an optical device that can deal with a relative difference in thermal expansion coefficient between the reflecting mirror and the mirror support mechanism and can support the reflecting mirror with a simpler structure than before are desired.

In the prior art, a mirror support mechanism that supports a reflecting mirror and an optical device that includes the mirror support mechanism are known, the mirror support mechanism and the optical device including a reflecting mirror including a supported portion provided on a rear surface of the reflecting mirror, the rear surface being a surface existing on the contrary side to a reflecting surface that reflects light, and having three supported surfaces arranged with rotational symmetry of 120 degrees around an optical axis, a structure member provided on the rear side of the reflecting mirror, and three supporting members each including a mirror supporting portion that supports a corresponding one of the three supported surfaces and having two ends connected to the supporting member (for example, PTL 1). In such an optical device, the supporting member can deal with a relative difference in thermal expansion coefficient between the reflecting mirror and the structure member that supports the reflecting mirror. Specifically, in the optical device, the supporting member includes beam portions connected to both sides of the mirror supporting portion, and flange portions each connected perpendicularly to an end of each beam portion that is not connected to the mirror supporting portion, and the structure member includes a beam fixing portion to which the flange portion is connected.

CITATION LIST

Patent Literature

PTL 1: WO2020-122196

SUMMARY OF INVENTION

Technical Problem

The mirror support mechanism that supports the reflecting mirror and the optical device that includes the mirror support mechanism in the prior art, however, have a problem that deformation caused by a tensile force or a compressive force generated in the beam portion (supporting member) is not considered.

The present disclosure has been made to solve the above-described problem, and it is therefore an object of the present disclosure to obtain a mirror support mechanism capable of reducing deformation caused by a tensile force or a compressive force generated in a supporting member.

Solution to Problem

A mirror support mechanism according to the present disclosure includes three first supporting members and three second supporting members. Each first supporting member includes a mirror supporting portion and two first beam portions. A reflecting mirror includes a reflecting surface that reflects light and a supported portion provided on a rear surface being a surface of the reflecting mirror existing on the contrary side to the reflecting surface. The mirror supporting portion is in contact with a corresponding one of three supported surfaces to support the corresponding supported surface. The three supported surfaces are provided on the supported portion of the reflecting mirror with rotational symmetry of 120 degrees around an optical axis. Each first beam portion is connected to each side of a corresponding mirror supporting portion. Each second supporting member includes a supporting portion and two second beam portions. Ends of two of the three first beam portions, the ends being located adjacent to each other, and each of the ends not being connected to the mirror supporting portion, are connected to the supporting portion. Each second beam portion is connected to each side of the supporting portion. An end of each second beam portion, the end not being connected to the supporting portion, is supported by a structure member provided on the rear side of the reflecting mirror.

A mirror support mechanism according to the present disclosure supports a reflecting mirror including a reflecting surface that reflects light and a supported portion provided on a rear surface being a surface of the reflecting mirror existing on the contrary side to the reflecting surface and including three supported surfaces provided with rotational symmetry of 120 degrees around an optical axis. The mirror support mechanism includes three first supporting members and a second supporting member. The three first supporting members have a hexagonal outer shape in which a side of a first length and a side of a second length are alternately located adjacent to each other in an optical axis perpendicular plane that is a plane perpendicular to the optical axis. Each first supporting member includes a mirror supporting portion being formed at a center of each side of the first length and being in contact with a corresponding one of the three supported surfaces to support the corresponding supported surface. The second supporting member has a hexagonal outer shape in which a side of a third length and a side of a fourth length are alternately located adjacent to each other in the optical axis perpendicular plane. Three connecting portions each formed at each side of the fourth length are connected to a structure member provided on the rear side of the reflecting mirror.

Advantageous Effects of Invention

According to the present disclosure, a mirror support mechanism that reduces deformation caused by a tensile force or a compressive force generated in a first supporting member can be obtained.

DESCRIPTION OF EMBODIMENTS

First Embodiment

With reference to FIGS. 1 to 6, an optical device according to a first embodiment is described. A mirror support mechanism according to the first embodiment is a mechanism included in the optical device according to the first embodiment. The mirror support mechanism according to the first embodiment may be considered to be a mirror support mechanism obtained as a result of removing a reflecting mirror 1, or reflecting mirror 1 and a structure member 2 from the optical device according to the first embodiment. Alternatively, the mirror support mechanism according to the first embodiment may be considered to be a first supporting member 9, or first supporting member 9 and a second supporting member 10. The mirror support mechanism may be referred to as a mirror support structure.

Figure 1:
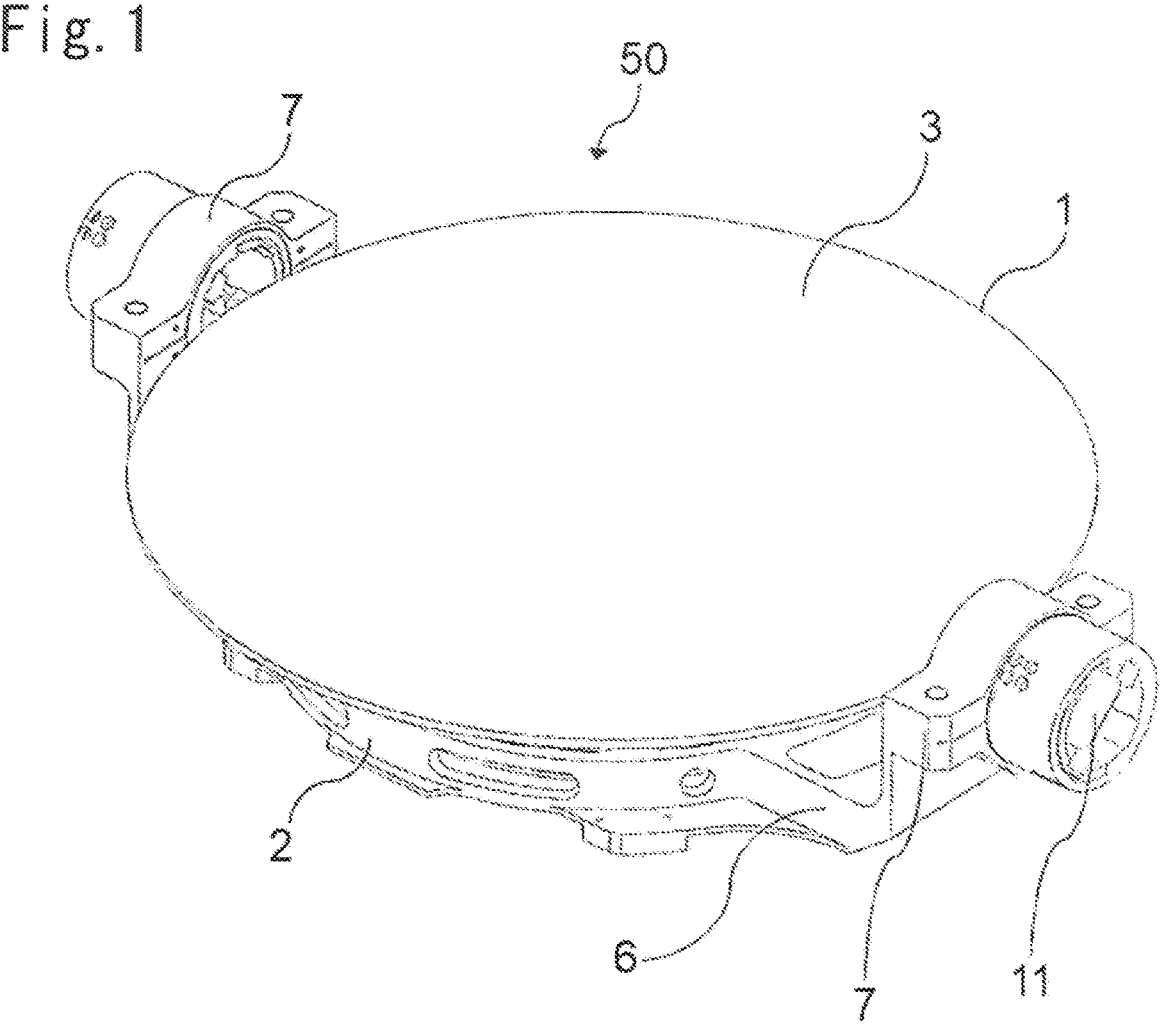
FIG. 1 is a perspective view of an optical device according to a first embodiment.
Figure 2:
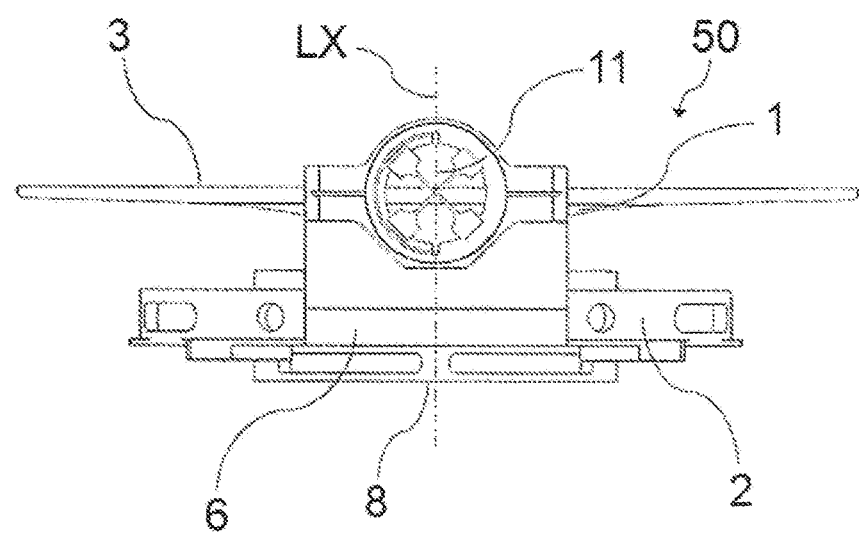
FIG. 2 is a front view of the optical device according to the first embodiment.
Figure 3:
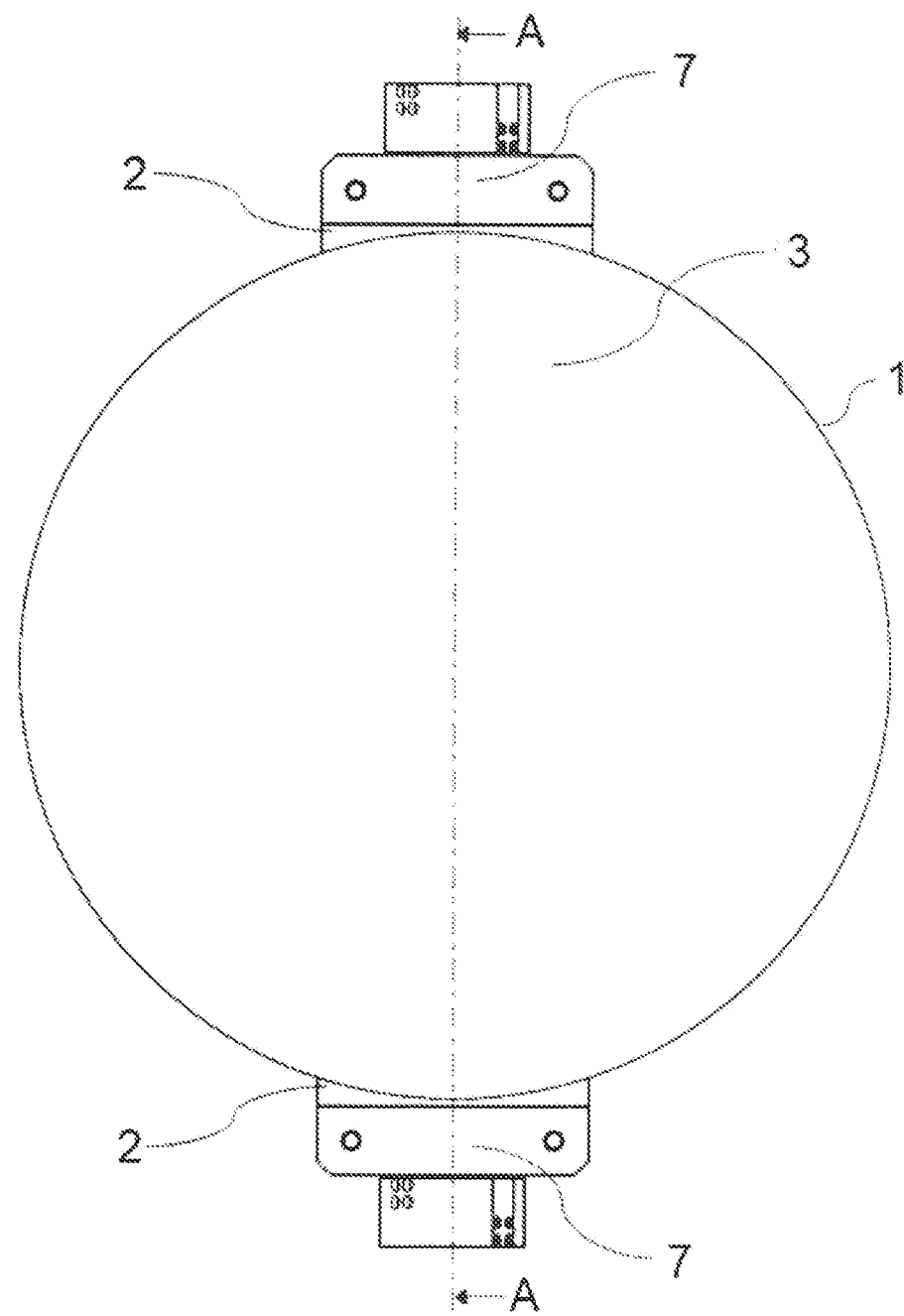
FIG. 3 is a plan view of the optical device according to the first embodiment.
Figure 4:
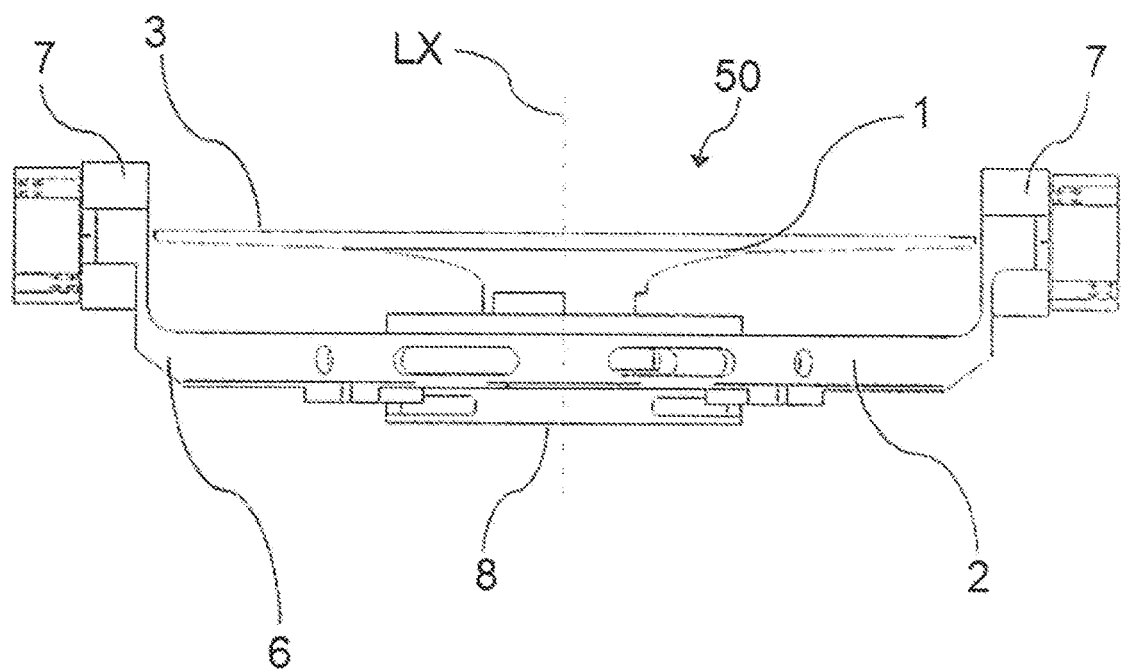
FIG. 4 is a right side view of the optical device according to the first embodiment.
Figure 5:
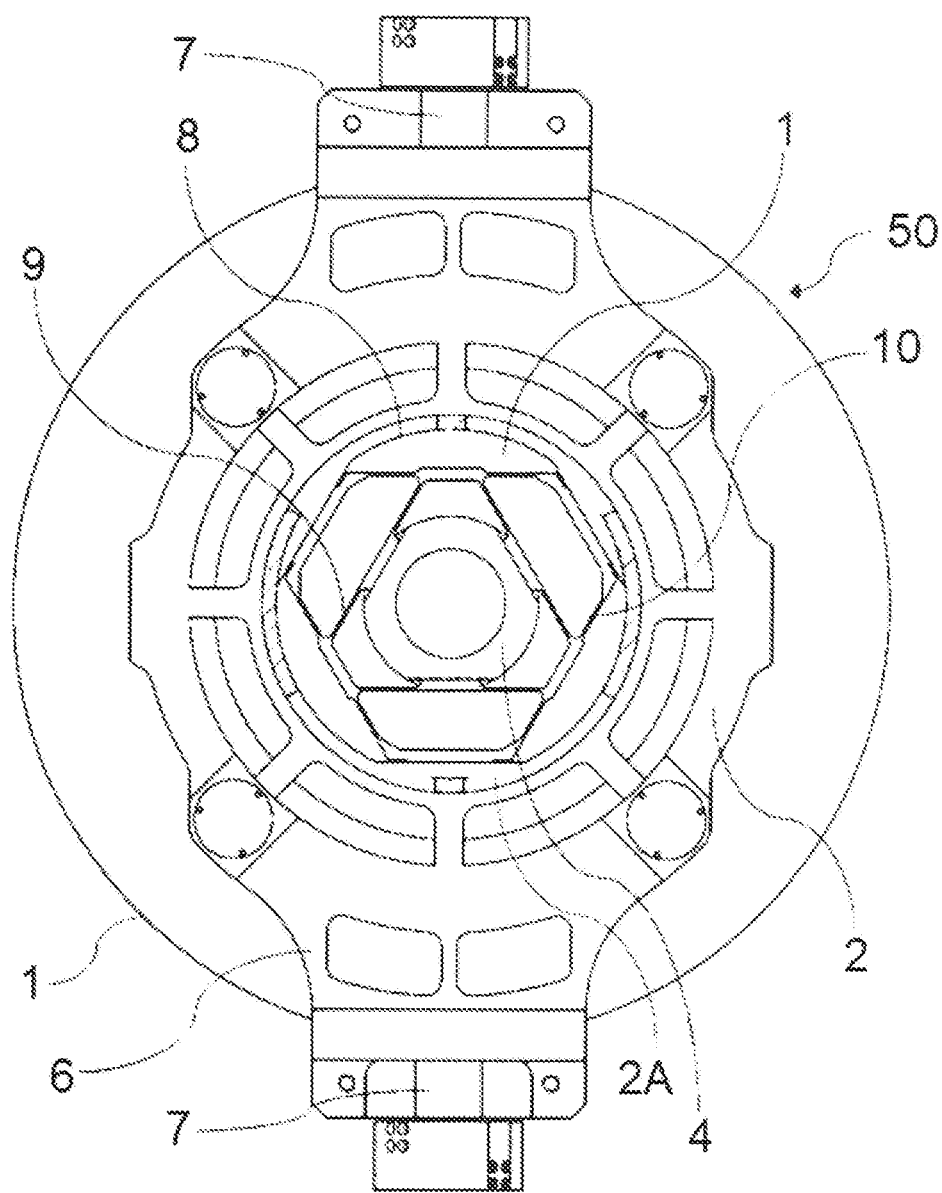
FIG. 5 is a bottom view of the optical device according to the first embodiment.
Figure 6:
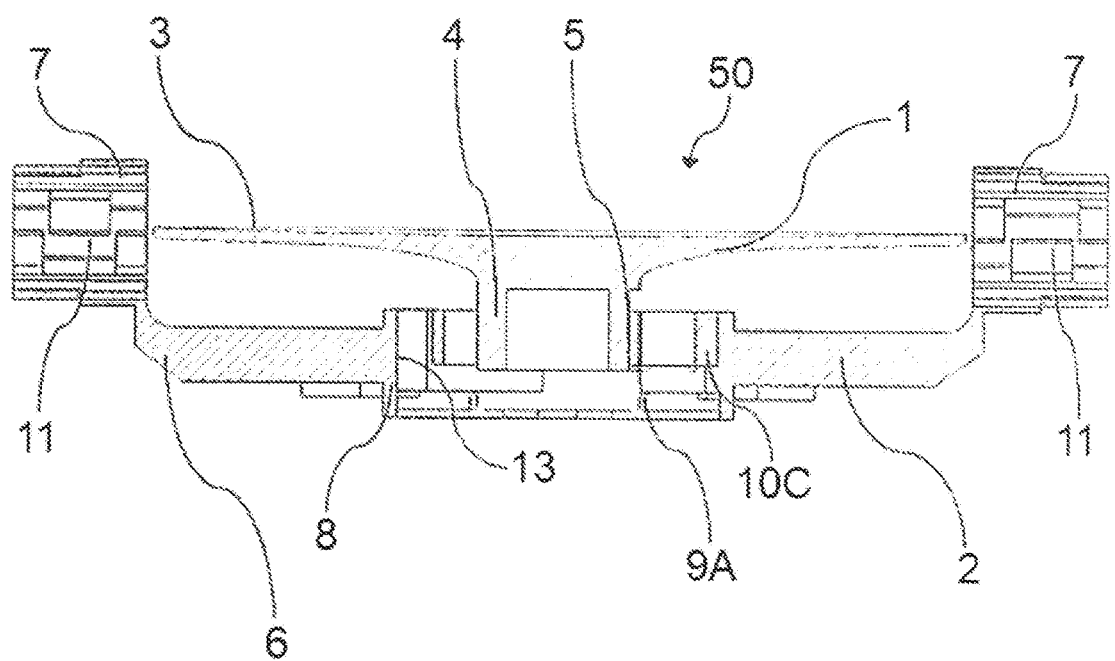
FIG. 6 is a cross-sectional view of the optical device according to the first embodiment.
Figure 9:
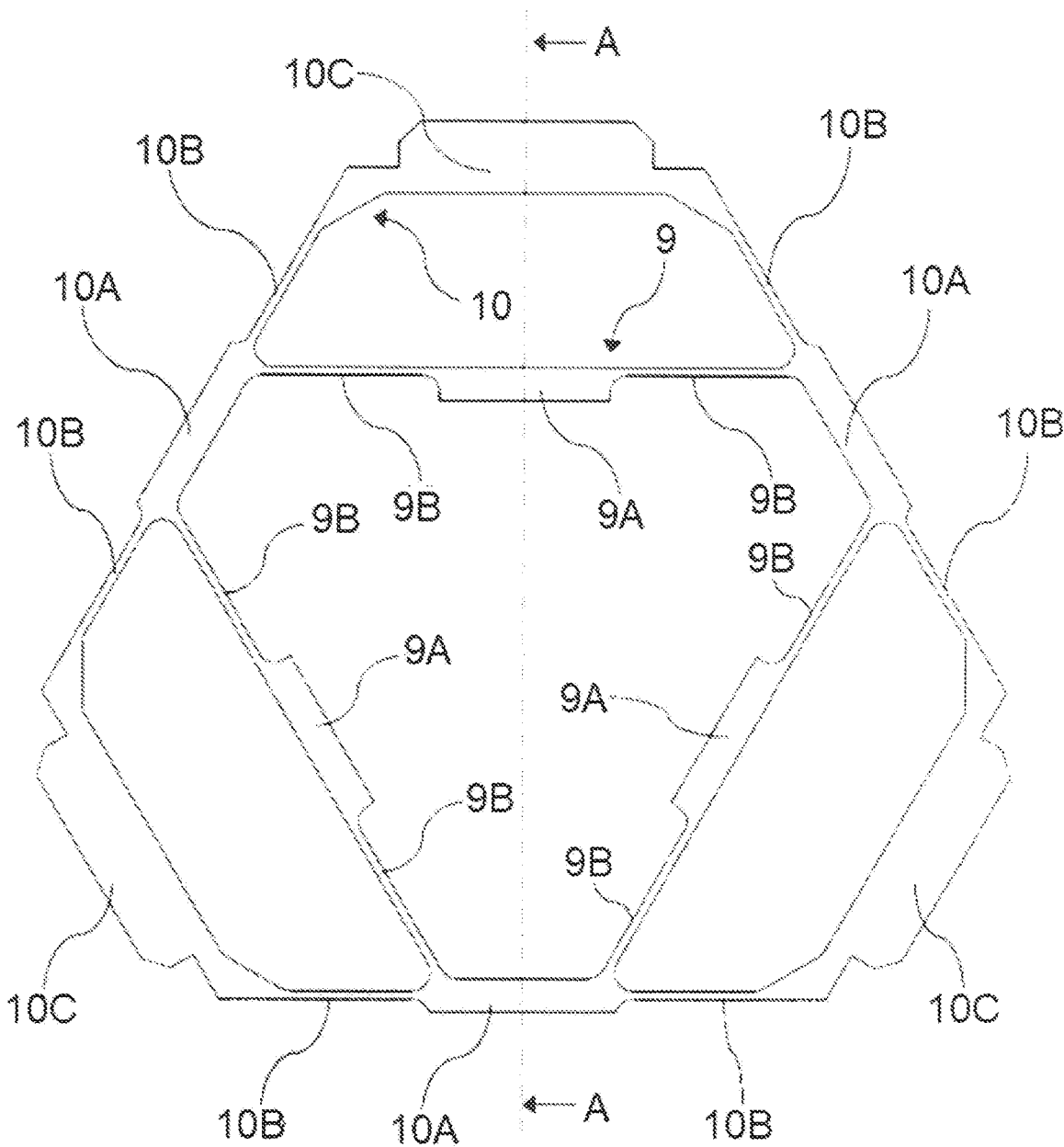
FIG. 9 is a plan view of the first supporting member and the second supporting member used to support the reflecting mirror in the optical device (mirror support mechanism) according to the first embodiment.

FIG. 1 is a perspective view of the optical device according to the first embodiment. FIGS. 2 to 5 are a front view, a plan view, a right side view, and a bottom view of the optical device, respectively. FIG. 6 is a cross-sectional view taken along a A-A cross section illustrated in FIG. 3. The A-A cross section is shown also in FIG. 9. FIG. 9 is described later. An optical device 50 includes reflecting mirror 1 and structure member 2. Optical device 50 constitutes an optical telescope used to observe celestial bodies or the like. Structure member 2 that is a mirror supporting member is a member that supports reflecting mirror 1. Reflecting mirror 1 includes a reflecting surface 3 and a supported portion 4. Reflecting surface 3 reflects observation light that is light used for observation. A surface of reflecting mirror 1 existing on the contrary side to reflecting surface 3 is referred to as a rear surface. Supported portion 4 is provided at a center of the rear surface of reflecting mirror 1. Supported portion 4 is a member supported by structure member 2.

Reflecting surface 3 is a concave surface having a circular outer shape. Supported portion 4 is a protrusion having a cylindrical outer shape. Supported portion 4 is provided at the center of the rear surface of reflecting mirror 1. In a portion of the protrusion near an end, supported surfaces 5 that are three flat surfaces parallel to an optical axis LX (Illustrated in FIGS. 2 and 4) of reflecting mirror 1 are provided. As described above, supported surfaces 5 are preferably flat surfaces formed on the protrusion and parallel to optical axis LX. Supported surfaces 5 are rectangular flat surfaces of the same size and are at an angle of 120 degrees to each other. Supported portion 4 has rotational symmetry of 120 degrees around optical axis LX. Supported surfaces 5 are preferably flat surfaces parallel to optical axis LX, but are not limited to such flat surfaces. Structure member 2 is a member that is provided on the rear side of reflecting mirror 1 to support reflecting mirror 1. Reflecting mirror 1 and structure member 2 are also applicable to an optical instrument that is not used for observation.

Structure member 2 includes a supporting board 6, a bearing part 7, and a supporting opening portion 8. Structure member 2 is provided with first supporting members 9 and second supporting members 10. Supporting board 6 is a main body of structure member 2. Supporting board 6 is a panel-shaped member provided on the rear side of reflecting mirror 1. As viewed from the direction of optical axis LX, supporting board 6 has a shape in which two approximately rectangular portions are connected to an approximately circular portion having a diameter smaller than an outer diameter of the reflecting mirror 1. The two approximately rectangular portions are provided symmetrically with respect to the approximately circular portion. Bearing part 7 is provided outside of each of the two approximately rectangular portions. Supporting board 6 has a surface existing on a side where reflecting mirror 1 exists, which is referred to herein as main surface, and has a surface existing on the contrary side to the main surface, which is referred to herein as rear surface. Each of bearing parts 7 is provided at a middle portion of each of two opposite sides of supporting board 6 as viewed from the direction of optical axis LX. Bearing part 7 has a shape protruding from supporting board 6. Bearing part 7 has a shaft holding hole 11 having a cylindrical internal space. Shaft holding holes 11 of two bearing parts 7 are provided so as to make their respective center axes coincident with each other and orthogonal to optical axis LX of reflecting mirror 1. The center axis of shaft holding hole 11 is parallel to the main surface of supporting board 6. A Y-axis member 12 having a columnar shape (not illustrated) is inserted into each of two shaft holding holes 11. The center axis of shaft holding hole 11 and the center axis of Y-axis member 12 coincide with each other. The center axis of Y-axis member 12 is referred to as a Y axis. Optical device 50 is rotatable around Y-axis member 12, that is, the Y-axis. An axis orthogonal to the Y axis in a plane perpendicular to optical axis LX is referred to as an X axis. A Z-axis orthogonal to the X axis and the Y axis is defined so as to coincide with optical axis LX.

Supporting opening portion 8, first supporting members 9, and second supporting members 10 are members for supporting supported portion 4 of reflecting mirror 1. Structure member 2 has supporting opening portion 8 that is provided with a hole in which supported portion 4 is contained. The hole provided in supporting opening portion 8 extends through supporting board 6. The inner surface surrounding the cylindrical opening space formed in supporting opening portion 8 is referred to herein as cylindrical surface 13. Cylindrical surface 13 is provided at a portion corresponding to disc-shaped supporting board 6 and a portion extending rearwards. Supporting opening portion 8 has an annular-shaped portion protruding from the rear surface of supporting board 6.

Supported portion 4 of reflecting mirror 1 is put into a space surrounded by cylindrical surface 13. In the space surrounded by cylindrical surface 13, supported portion 4 is supported by three first supporting members 9 and three second supporting members 10. A mirror supporting portion 9A formed in first supporting member 9 is in contact with supported surface 5 to support supported surface 5. First supporting member 9 is connected to a supporting portion 10A formed in second supporting member 10. Three connecting portions 10C formed in three second supporting members 10 are connected to structure member 2 provided on the rear side of reflecting mirror 1. Cylindrical surface 13 of structure member 2 is provided with three fixing portions 2A (illustrated in FIG. 5) to each of which a corresponding one of three connecting portions 10C is fixed.

Since supported portion 4 is supported by first supporting member 9 and second supporting member 10 in the space surrounded by cylindrical surface 13, structure member 2 can support reflecting mirror 1 with a shortened length of optical device 50 in the direction of optical axis LX. Alternatively, at the main surface side of supporting board 6 no supporting opening portion 8 is provided and, supported portion 4 may be supported by first supporting members 9 and second supporting members 10.

Three first supporting members 9 have a hexagonal outer shape (first hexagonal shape) having two types of side lengths and in which adjacent sides are different in length from each other in an optical axis perpendicular plane that is the plane perpendicular to optical axis LX. The outer shape of a plurality of members in a plane refers to a shape of a plane figure in convex shape including the plurality of members. Further, the outer shape of a plurality of members in a space refers to a shape of a three-dimensional shape (space figure) in convex shape including the plurality of members. In the first hexagonal shape, a side of a first length and a side of a second length are alternately located adjacent to each other. In first supporting member 9, the second length is shorter than the first length. The second length may be the same as or longer than the first length. Mirror supporting portion 9A is formed at a central portion (center) of each side of the first length. Mirror supporting portion 9A is a member connected to supported surface 5 to support supported surface 5. The outer shape of three first supporting members 9 in the optical axis perpendicular plane, that is, as viewed from the direction of optical axis LX, is the first hexagonal shape. It is desirable that interior angles of the first hexagonal shape are all the same (equal to one another). That is, it is desirable that all the interior angles of the first hexagonal shape are 120 degrees.

First supporting member 9 includes two first beam portions 9B each having one end connected to mirror supporting portion 9A and the other end connected to second supporting member 10. Mirror supporting portion 9A and first beam portion 9B each have a flat plate shape. A surface of mirror supporting portion 9A and a surface of first beam portion 9B existing relatively farther from supported portion 4 of reflecting mirror 1 form a continuous flat surface without level difference. Mirror supporting portion 9A is thicker than first beam portion 9B. Therefore, a surface of mirror supporting portion 9A that is in contact with supported surface 5 protrudes relative to a surface of first beam portion 9B facing to reflecting mirror 1. Although there are slight irregularities, it can be considered that first supporting member 9 has a shape in which a main portion is located on an approximately flat plane. Three first supporting members 9 are arranged so as to be parallel to optical axis LX and have rotational symmetry of 120 degrees. Three first supporting members 9 are arranged to be a hexagonal columnar outer shape. Mirror supporting portion 9A and first beam portion 9B correspond to the side of the first length of the first hexagonal shape in the optical axis perpendicular plane. The side of the second length corresponds to a central portion of second supporting member 10. Three first supporting members 9 may have a frustum outer shape rather than a columnar outer shape.

Further, three second supporting members 10 have a hexagonal outer shape (second hexagonal shape) having two types of side lengths and in which adjacent sides are different in length from each other in the optical axis perpendicular plane. In the second hexagonal shape, a side of a third length and a side of a fourth length are alternately located adjacent to each other. In second supporting member 10, the fourth length is shorter than the third length. The fourth length may be the same as or longer than the third length. Supporting portion 10A is formed at a center of each side of the third length. A position where supporting portion 10A is disposed corresponds to the side of the second length of the first hexagonal shape that is the outer shape of first supporting member 9. Supporting portion 10A supports first supporting member 9. Connecting portion 10C is formed on each of three sides of the fourth length of the second hexagonal shape. Two second beam portions 10B have their respective ends connected to connecting portion 10C. Connecting portion 10C is connected to structure member 2 (fixing portion 2A) provided on the rear side of reflecting mirror 1. As with first supporting member 9, the outer shape of three second supporting members 10 in the optical axis perpendicular plane, that is, as viewed from the direction of optical axis LX is the second hexagonal shape. It is desirable that interior angles of the second hexagonal shape are equal to one another. That is, it is desirable that all the interior angles of the second hexagonal shape be 120 degrees.

Second supporting member 10 includes second beam portion 10B having one end connected to supporting portion 10A and the other end connected to connecting portion 10C. Supporting portion 10A is thicker than second beam portion 10B. Their respective thickness central positions of supporting portion 10A and second beam portion 10B are approximately the same. Supporting portion 10A protrudes, relative to second beam portion 10B, in both sides toward and away from supported portion 4 of reflecting mirror 1. It can be considered that supporting portion 10A and second beam portion 10B each has a shape in which a main portion is located on an approximately flat plane. Three sets of supporting portions 10A and second beam portions 10B are arranged so as to be parallel to optical axis LX and have rotational symmetry of 120 degrees. In the second hexagonal shape, connecting portion 10C is disposed between two adjacent second beam portions 10B. Connecting portion 10C has a portion protruding away from supported portion 4. A back side of the protruding portion of connecting portion 10C is a flat surface. At a corner portion where second beam portion 10B and connecting portion 10C are connected, connecting portion 10C has inclined surfaces on the back side so as to make the plate thickness larger for reinforcement. Supporting portion 10A and second beam portion 10B correspond to the side of the third length of the second hexagonal shape in the optical axis perpendicular plane. Connecting portion 10C corresponds to the side of the fourth length.

Three second supporting members 10 have an annular outer shape as viewed from the direction of optical axis LX. It can also be considered that there is one annular-shaped second supporting member 10. Annular-shaped second supporting member 10 has three sets of supporting portion 10A and two second beam portions 10B, and three connecting portions 10C. Regardless of considering that second supporting member 10 is three second supporting members 10 or one second supporting member 10, second supporting member 10 has a hexagonal columnar outer shape. Three second supporting members 10 or one second supporting member 10 may be a frustum outer shape rather than a columnar outer shape.

Figure 7:
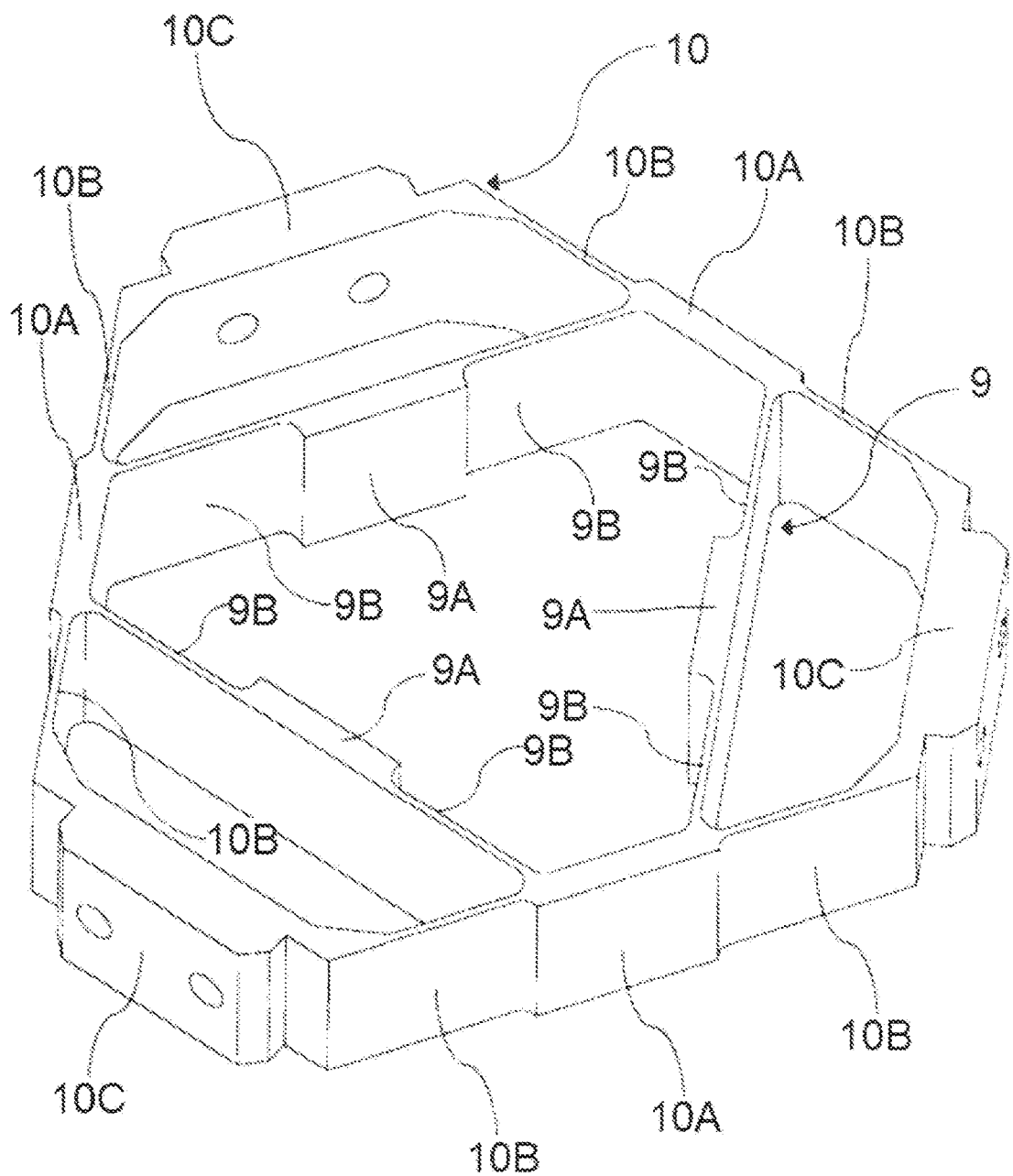
FIG. 7 is a perspective view of a first supporting member and a second supporting member used to support a reflecting mirror in the optical device (mirror support mechanism) according to the first embodiment.

With reference to FIGS. 7 to 11, the structure of the mirror support mechanism including first supporting members 9 and second supporting members 10 is described in more detail. FIG. 7 is a perspective view of first supporting members 9 and second supporting members 10. FIGS. 8 to 11 are a front view, a plan view, a right side view, and a rear view of first supporting members 9 and second supporting members 10, respectively. The mirror support mechanism includes three first supporting members 9 and three second supporting members 10. Three first supporting members 9 each includes mirror supporting portion 9A that is in contact with supported surface 5 to support supported surface 5. The number of mirror supporting portions 9A is three. Three mirror supporting portions 9A each is in contact with a corresponding one of three supported surfaces 5 having rotational symmetry of 120 degrees and is connected to supported surface 5. First beam portion 9B is a member connected to each side of mirror supporting portion 9A in first supporting member 9.

Each of three second supporting members 10 is interposed between two ends, which are located adjacent to each other, of two first supporting members 9 and structure member 2. Structure member 2 is provided on the rear side of reflecting mirror 1. Three second supporting members 10 are members that connect both ends of three first supporting members 9 and structure member 2 indirectly. Each of three supporting portions 10A is a member to which ends, which are located adjacent to each other, of two first beam portions 9B that are not connected to mirror supporting portion 9A are connected. Two adjacent ends of first beam portions 9B are connected to each supporting portion 10A. Second beam portion 10B is a member connected to each side of supporting portion 10A. Two adjacent ends of second beam portions 10B that are not connected to supporting portion 10A are connected to connecting portion 10C. Each connecting portion 10C is a member connected to a corresponding one of three fixing portions 2A of structure member 2. Each second beam portion 10B is connected to and supported by structure member 2 via connecting portion 10C. Since each second beam portion 10B is connected to fixing portion 2A via connecting portion 10C, each second beam portion 10B can be connected easily to structure member 2. Further, it is easy to set a position where each second beam portion 10B is attached to structure member 2 to a desired position.

Mirror supporting portion 9A is disposed at a central portion of first supporting member 9. First supporting member 9 has mirror supporting portion 9A provided at the center of first supporting member 9, and has two first beam portions 9B connected to both sides of mirror supporting portion 9A. Each of two first beam portions 9B connected to mirror supporting portion 9A is connected to a corresponding one of two supporting portions 10A. Mirror supporting portion 9A is disposed at a center position between two supporting portions 10A. As described above, the outer shape of first supporting member 9 and the outer shape of second supporting member 10 have a hexagonal outer shape in the plane perpendicular to optical axis LX (optical axis perpendicular plane). Supporting portion 10A may be considered to be a member included in first supporting member 9.

It is preferable that the annular outer shape in the optical axis perpendicular plane formed by mirror supporting portion 9A, first beam portion 9B, and supporting portion 10A is a hexagonal shape. In the optical axis perpendicular plane, each first beam portion 9B has the same length, each supporting portion 10A has the same length, and first beam portion 9B is longer than supporting portion 10A. Each mirror supporting portion 9A has the same length. It is preferable that the interior angles of the first hexagonal shape formed by mirror supporting portion 9A, first beam portion 9B, and supporting portion 10A are all the same (120 degrees). Likewise, it is preferable that, in the optical axis perpendicular plane, the annular outer shape formed by supporting portion 10A, second beam portion 10B, and connecting portion 10C is a hexagonal shape. Each second beam portion 10B has the same length, each connecting portion 10C has the same length, and second beam portion 10B is longer than connecting portion 10C. It is preferable that the interior angles of the second hexagonal shape formed by supporting portion 10A, second beam portion 10B, and connecting portion 10C are all the same (120 degrees).

First supporting member 9 has a shape formed by plate members connected to each other, and second supporting member 10 has a shape formed by plate members connected to each other. Mirror supporting portion 9A is thicker than a portion of first supporting member 9 connected to mirror supporting portion 9A. Supporting portion 10A is thicker than a portion of second supporting member 10 connected to supporting portion 10A. Connecting portion 10C is thicker than a portion of second supporting member 10 connected to connecting portion 10C. First supporting members 9 and second supporting members 10 are plate springs. A portion extending from each side of connecting portion 10C to a position where connecting portion 10C is connected to second beam portion 10B may be referred to as a third beam portion. It is desirable that mirror supporting portion 9A, supporting portion 10A, and connecting portion 10C have a rectangular shape as viewed from the normal direction. Likewise, it is desirable that first beam portion 9B, second beam portion 10B, and the third beam portion have a rectangular shape. Mirror supporting portion 9A, supporting portion 10A, connecting portion 10C, first beam portion 9B, and second beam portion 10B having a rectangular shape have a short side in the direction of optical axis LX. On the other hand, the third beam portion having a rectangular shape has a long side in the direction of optical axis LX.

Further, in a case where supported surfaces 5 are parallel to optical axis LX, mirror supporting portion 9A of first supporting member 9 is a flat surface parallel to optical axis LX. Furthermore, it is preferable that fixing portions 2A formed on cylindrical surface 13 of structure member 2 are flat surfaces parallel to optical axis LX. Further, connecting portion 10C of second supporting member 10 is a flat surface parallel to optical axis LX. It is preferable that supporting portions 10A of second supporting members 10 are flat surfaces parallel to optical axis LX even in a case where first supporting member 9 and second supporting member 10 are inseparable from each other.

In the first hexagonal shape, members may be further formed on the sides of the second length to form one annular-shaped member together with three first supporting members 9. Such a one annular-shaped member may be referred to as one annular-shaped first supporting member. The member disposed on the side of the second length of the annular-shaped first supporting member is referred to as a supporting portion of the first supporting member. Their respective supporting portions of the annular-shaped first supporting member and the annular-shaped second supporting member may be connected to each other. That is, the supporting portion of the first supporting member and supporting portion 10A of second supporting member 10 may be connected to each other. In this case, it is preferable that the supporting portion of the first supporting member and supporting portion 10A of second supporting member 10 are flat surfaces parallel to optical axis LX.

Figure 8:
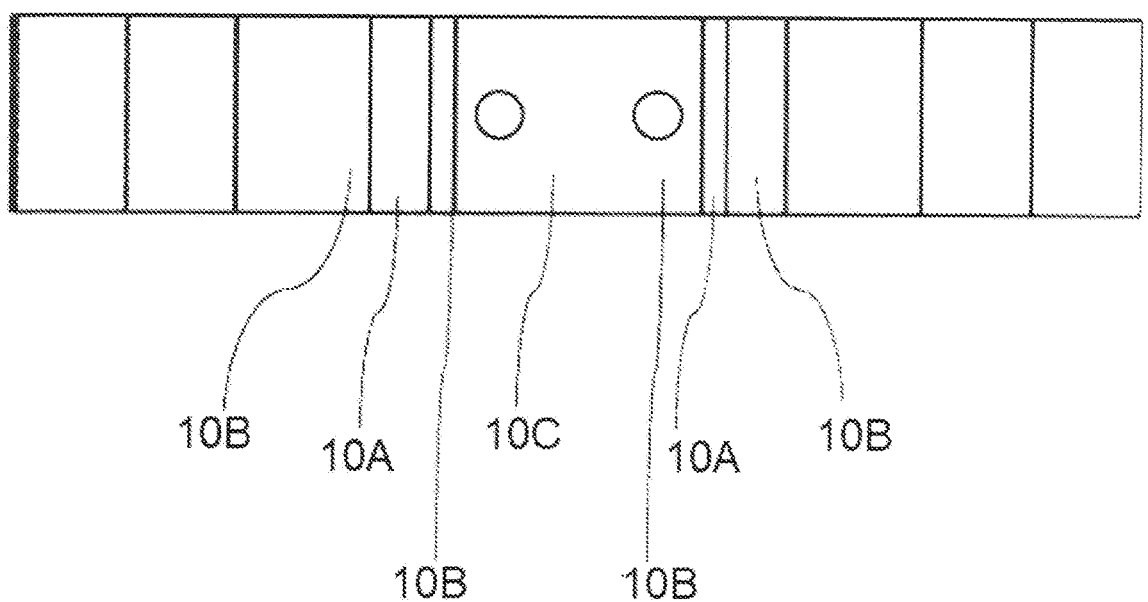
FIG. 8 is a front view of the first supporting member and the second supporting member used to support the reflecting mirror in the optical device (mirror support mechanism) according to the first embodiment.
Figure 10:
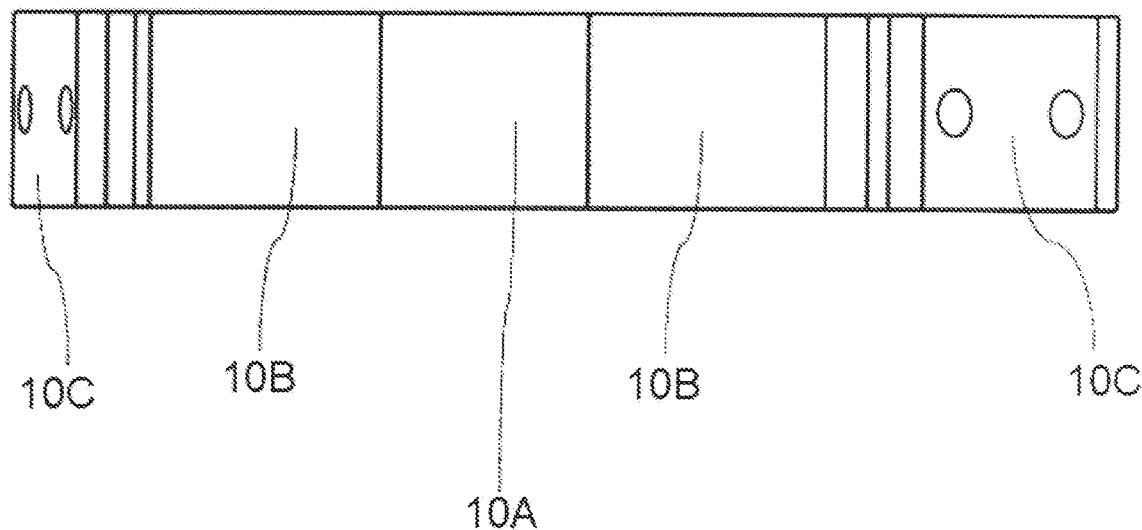
FIG. 10 is a right side view of the first supporting member and the second supporting member used to support the reflecting mirror in the optical device (mirror support mechanism) according to the first embodiment.
Figure 11:
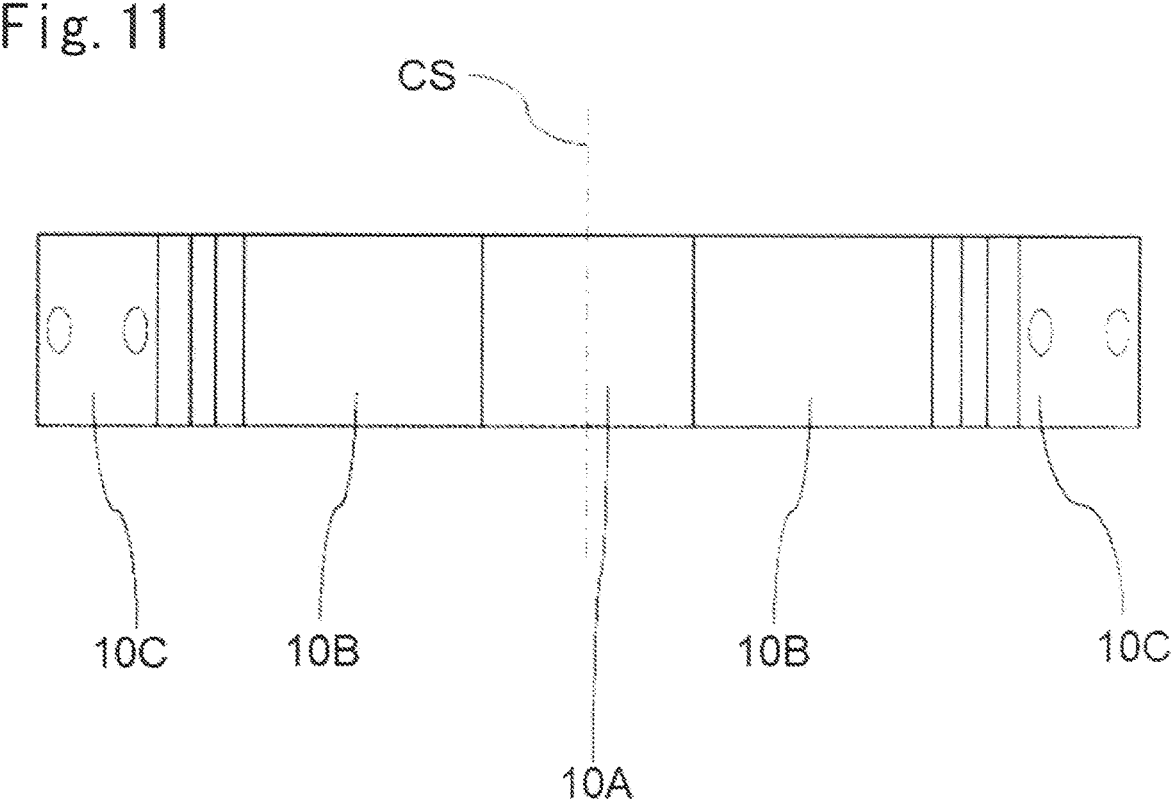
FIG. 11 is a rear view of a supporting beam used to support the reflecting mirror in the optical device (mirror support mechanism) according to the first embodiment.
Figure 12:
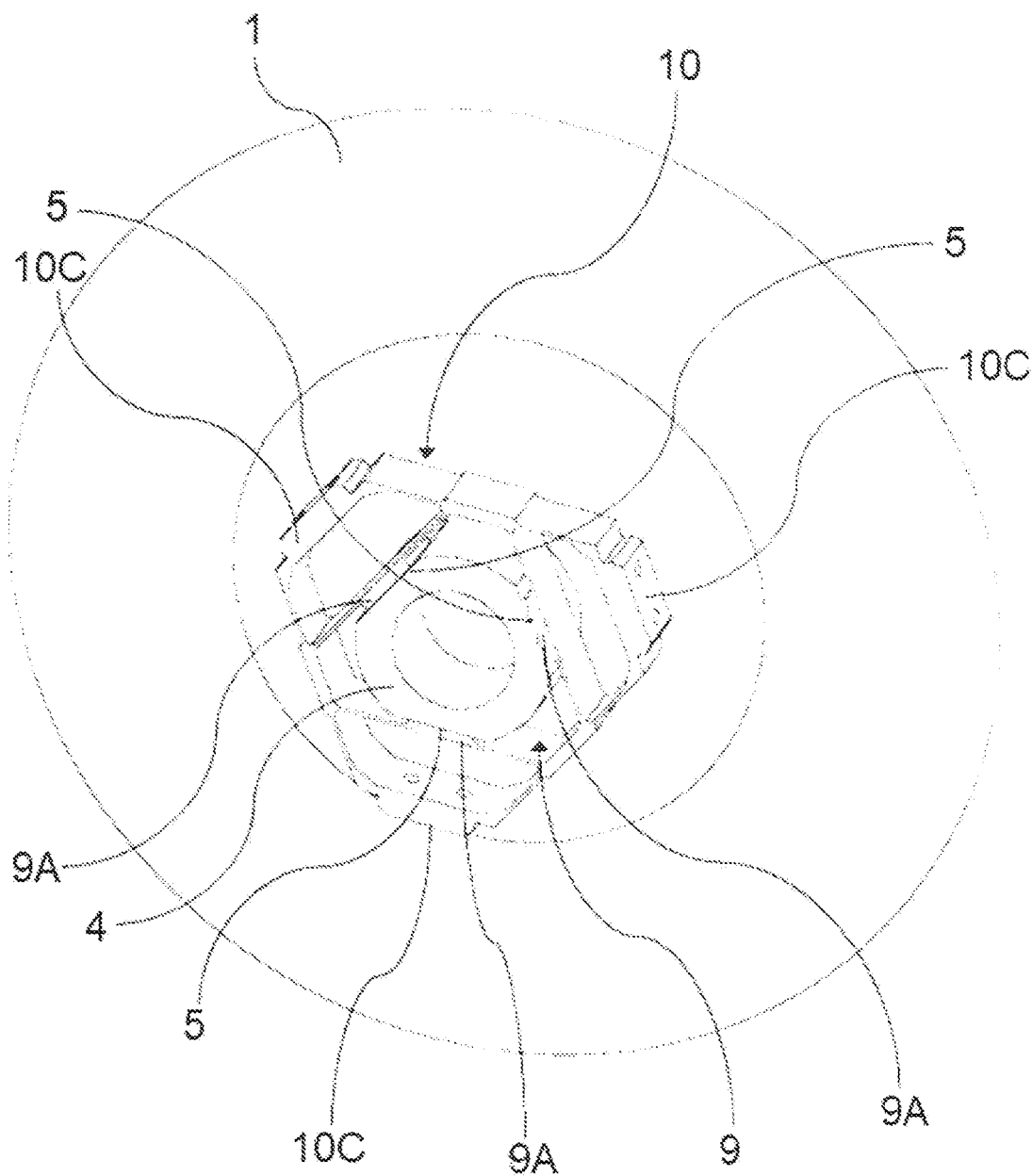
FIG. 12 is a perspective view of the reflecting mirror supported by the first supporting member and the second supporting member in the optical device according to the first embodiment.
Figure 13:
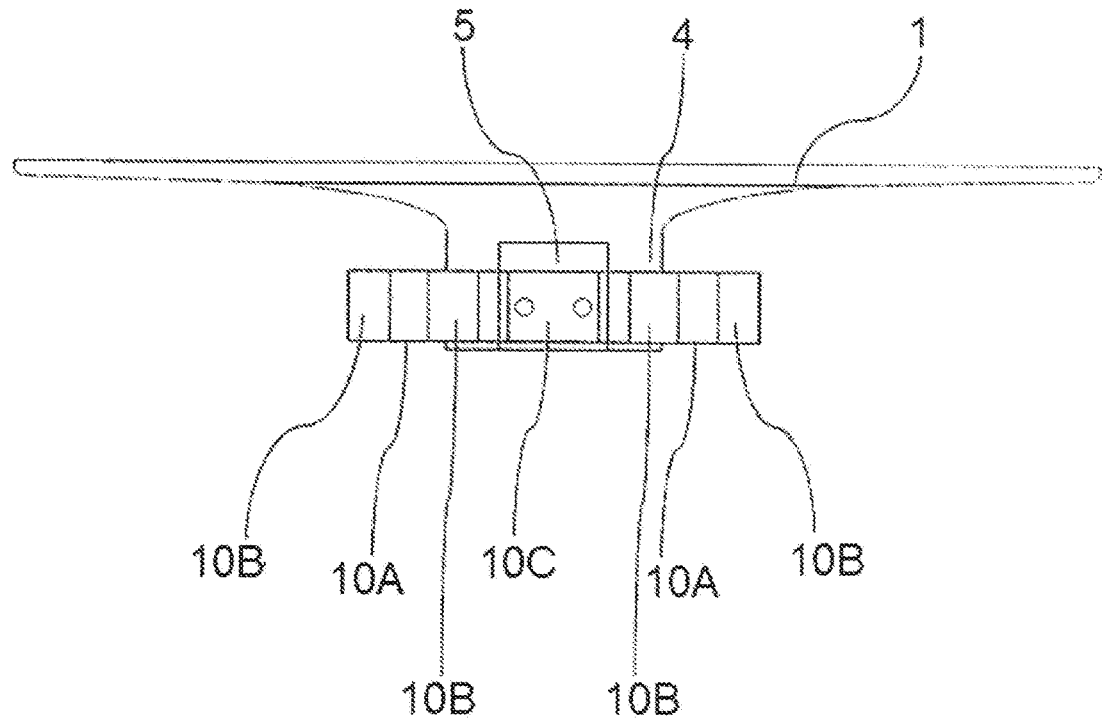
FIG. 13 is a front view of the reflecting mirror supported by the first supporting member and the second supporting member in the optical device according to the first embodiment.
Figure 14:
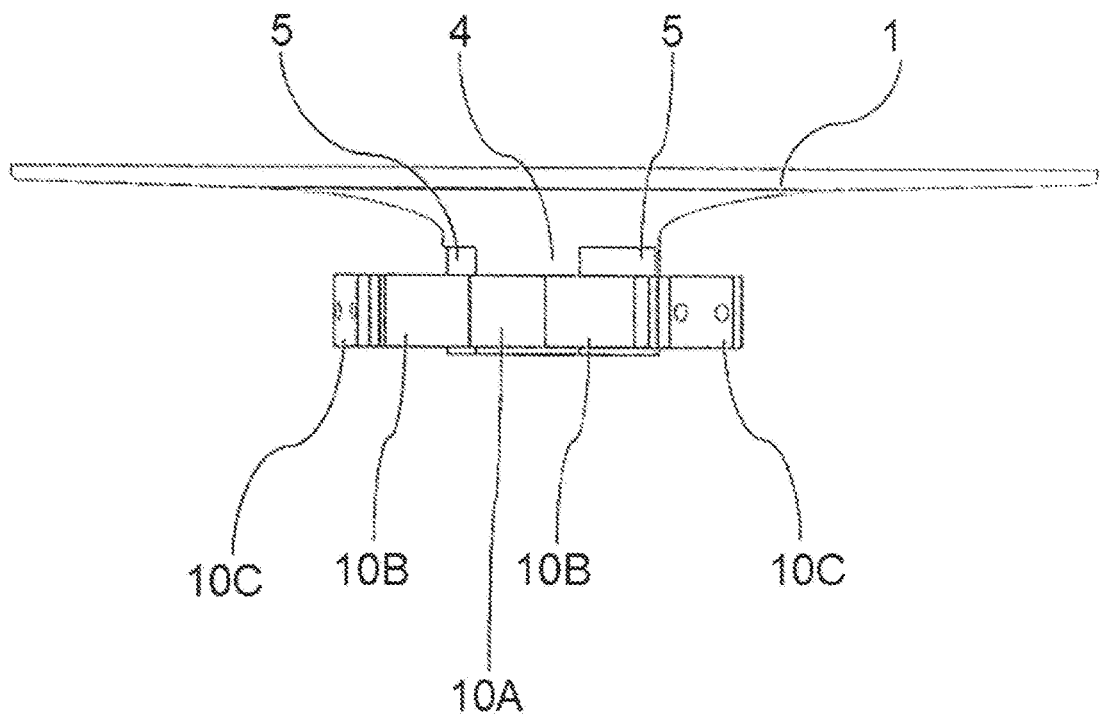
FIG. 14 is a right side view of the reflecting mirror supported by the first supporting member and the second supporting member in the optical device according to the first embodiment.
Figure 15:
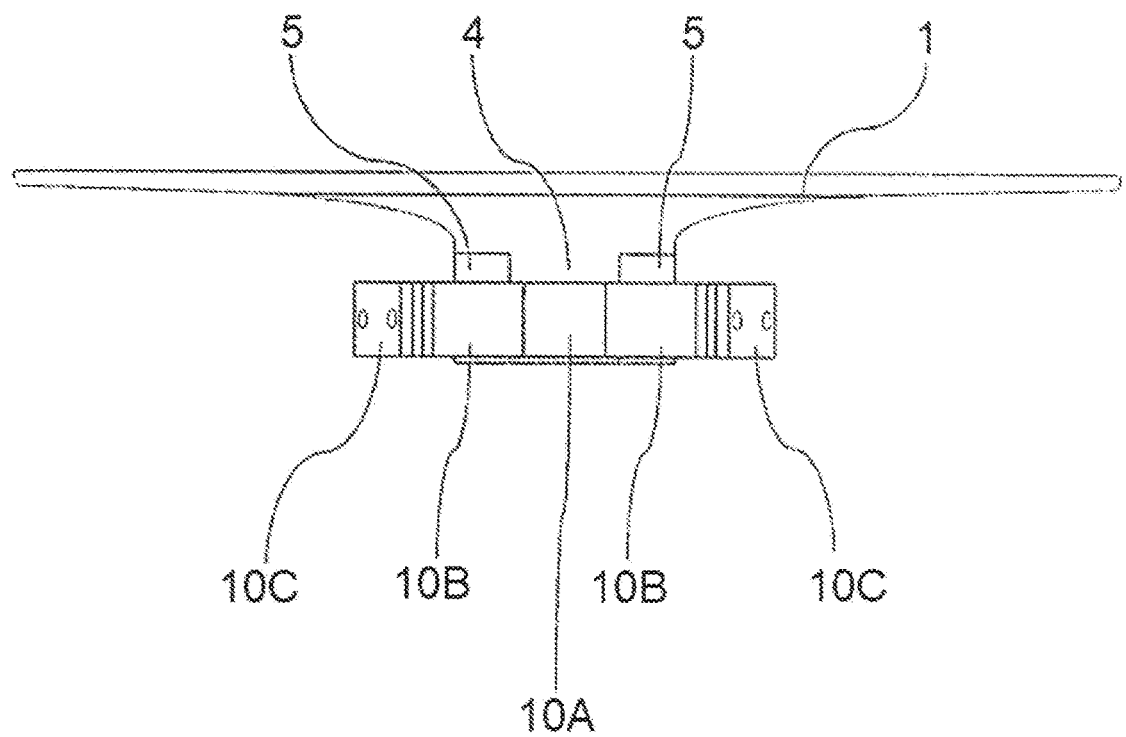
FIG. 15 is a rear view of the reflecting mirror supported by the first supporting member and the second supporting member in the optical device according to the first embodiment.
Figure 16:
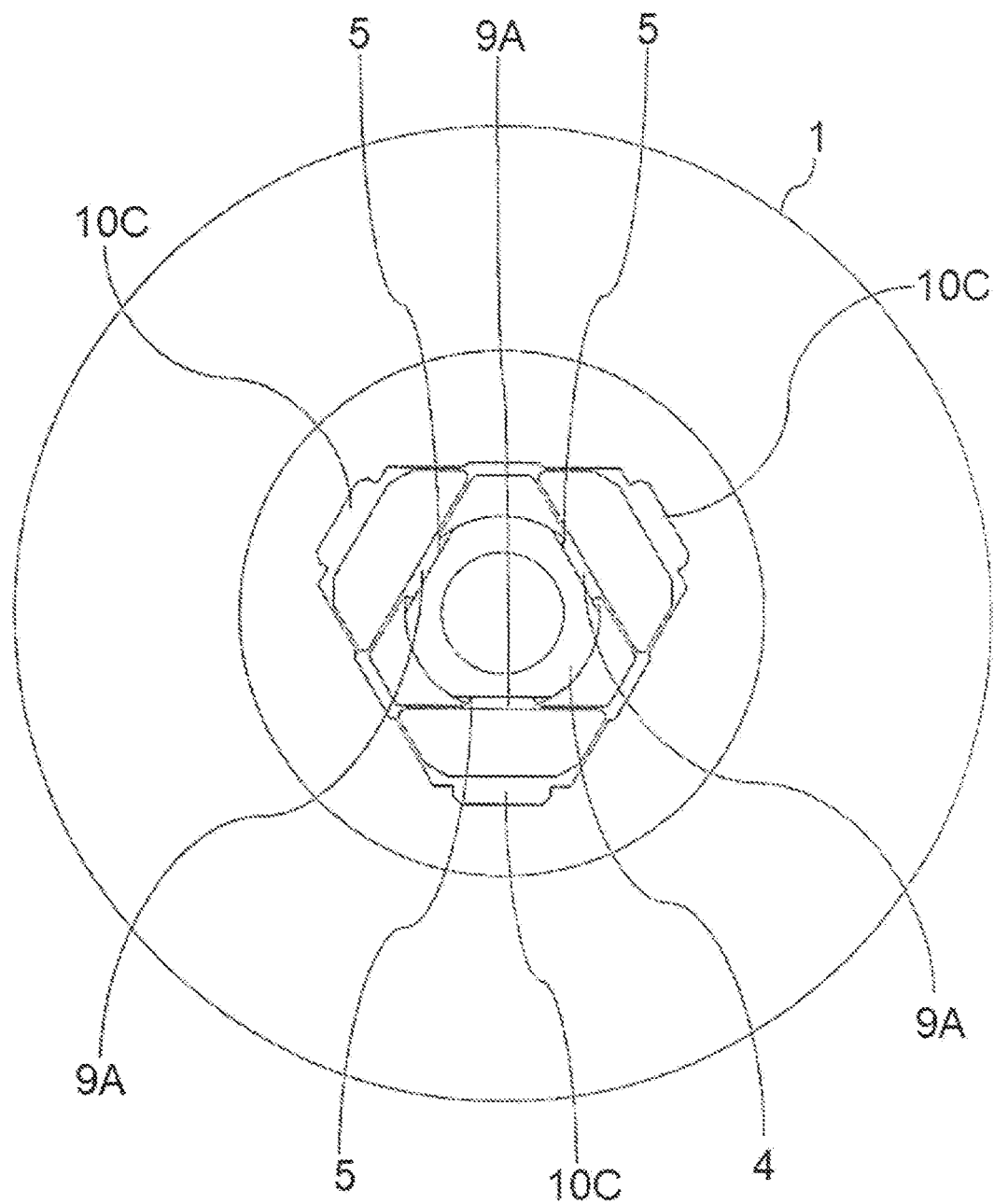
FIG. 16 is a bottom view of the reflecting mirror supported by the first supporting member and the second supporting member in the optical device according to the first embodiment.

For example, mirror supporting portion 9 and supported surface 5 are bonded with an adhesive. Fixing portion 2A and connecting portion 10C are connected with a bolt, for example. Two holes provided in connecting portion 10C illustrated in FIGS. 8, 10, and 11 are holes into which a shank of the bolt is inserted. In a case where first supporting member 9 and second supporting member 10 are separable from each other and each of first supporting member 9 and second supporting member 10 has a supporting portion, the supporting portions may be connected with a bolt.

It may also be considered that the mirror support mechanism according to the first embodiment includes structure member 2. Second supporting member 10 may be formed integrally with structure member 2. It may also be considered that structure member 2 formed integrally with second supporting member 10 includes second supporting member 10. In this case, it can be considered that first supporting member 9 is supported by structure member 2 directly. First supporting member 9 and second supporting member 10 may be inseparable from each other. Structure member 2 of the optical device (mirror support mechanism) according to the first embodiment has a hole (supporting opening portion 8) in which supported portion 4 is contained. Cylindrical surface 13 is formed as an inner surface of the hole.

Plate-shaped first supporting member 9 and plate-shaped second supporting member 10 have appropriate elasticity. Therefore, a radial displacement of the portion where mirror supporting portion 9A supports supported surface 5, caused by a difference in thermal expansion coefficient between reflecting mirror 1 and structure member 2, can be absorbed by flexure of first supporting members 9. Then, a tensile force or a compressive force applied to supporting portion 10A via first beam portion 9B can be absorbed and reduced by flexure of second supporting members 10. In general, reflecting mirror 1 is lower in thermal expansion coefficient, and structure member 2 is higher in thermal expansion coefficient. Therefore, the difference in thermal expansion coefficient tends to cause a tensile force to be applied to structure member 2. In a case where components made of a plurality of materials having different thermal expansion coefficients are used for structure member 2, a compressive force may be applied to the members constituting structure member 2 in a manner that depends on how the components are connected. First supporting member 9 can support supported portion 4 without applying excessive stress to supported portion 4 in response to expansion or contraction, in the radial direction, of supported portion 4. That is, it is only required that first supporting member 9 have a structure that allows mirror supporting portion 9A to be moved in the radial direction of reflecting mirror 1, and second supporting member 10 have a structure that allows supporting portion 10A to be moved in the radial direction of reflecting mirror 1. Even when one or both of mirror supporting portion 9A and supporting portion 10A move in the radial direction, the central position of supported portion 4 remains unchanged relative to structure member 2.

As illustrated in FIG. 11, three first supporting members 9 and three second supporting members 10 have plane symmetry with respect to a central plane CS passing through each of three sets of mirror supporting portion 9A, supporting portion 10A, and connecting portion 10C. Central planes CS pass through their respective centers in directions perpendicular to mirror supporting portions 9A, supporting portions 10A, and connecting portions 10C, each having a rectangular parallelepiped shape. Since the three sets of mirror supporting portion 9A, supporting portion 10A, and connecting portion 10C are arranged with rotational symmetry of 120 degrees, there are three central planes CS. A position of the cross section A-A illustrated in FIG. 9 coincides with a position of one of three central planes CS. Three central planes CS are arranged with rotational symmetry of 120 degrees. Since three first supporting members 9 and three second supporting members 10 have plane symmetry with respect to three central planes CS, three first supporting members 9 and three second supporting members 10 can support reflecting mirror 1 uniformly and stably.

The reason why three central planes CS are present for three first supporting members 9 and three second supporting members 10 is that the following propositions (A) to (E) all are true.

(A) Each mirror supporting portion 9A has the same length ($L_0$).
(B) Each first beam portion 9B has the same length ($L_1$).
(C) Each supporting portion 10A has the same length ($L_2$).
(D) Each second beam portion 10B has the same length ($L_3$).
(E) Each connecting portion 10C has the same length ($L_4$).

In a case (case 1) where the propositions (A) to (E) are true, the following propositions (F) to (M) are true. Optical device 50 corresponds to case 1.

(F) Each first supporting member 9 has the same length ($L_0+2*L_1$).
(G) Each second supporting member 10 has the same length ($L_2+2*L_3$).
(H) Each interior angle of the first hexagonal shape formed by first supporting member 9 and supporting portion 10A is 120 degrees.
(J) Each interior angle of the second hexagonal shape formed by second supporting member 10 and connecting portion 10C is 120 degrees.
(K) In each of three sets of mirror supporting portion 9A, supporting portion 10A, and connecting portion 10C, a perpendicular bisector of mirror supporting portion 9A, a perpendicular bisector of supporting portion 10A, and a perpendicular bisector of connecting portion 10C coincide with each other in the optical axis perpendicular plane and are present on central plane CS.
(L) In the optical axis perpendicular plane, each angle ($\theta_1$) formed by supporting portion 10A and first beam portion 9B is 120 degrees.
(M) In the optical axis perpendicular plane, each angle ($\theta_2$) formed by connecting portion 10A and second beam portion 10B is 120 degrees.

Consider a case (case 2) where propositions (B1) and (B2) are true instead of the proposition (B), and propositions (D1) and (D2) are true instead of the proposition (D).

(B1) Each first beam portion 9B connected to a corresponding mirror supporting portion 9A on a counter-clockwise side in a rotation around optical axis LX has the same length ($L_{1A}$).
(B2) Each first beam portion 9B connected to a corresponding mirror supporting portion 9A on a clockwise side in the rotation around optical axis LX has the same length ($L_{1B} \neq L_{1A}$).
(D1) Each second beam portion 10B connected to a corresponding supporting portion 10A on the counterclockwise side in the rotation around optical axis LX has the same length ($L_{3A}$).
(D2) Each second beam portion 10B connected to a corresponding supporting portion 10A on the counter-clockwise side in the rotation around optical axis LX has the same length ($L_{3B} \neq L_{3A}$).

Case 2 is a case where the propositions (A), (B1), (B2), (C), (D1), (D2), and (E) are true. In case 2, the propositions (F) to (J) and propositions (N) to (V) shown below are true.

(N) In the optical axis perpendicular plane, optical axis LX is present on the perpendicular bisector of each first supporting member 9.
(P) In the optical axis perpendicular plane, optical axis LX is present on the perpendicular bisector of each second supporting member 10.
(Q) In the optical axis perpendicular plane, optical axis LX is present on the perpendicular bisector of each connecting portion 10C.
(R) In the optical axis perpendicular plane, the angles formed by each first beam portion 9B connected to a corresponding supporting portion 10A on the counterclockwise side in the rotation around optical axis LX and the corresponding supporting portion 10A are the same ($\theta_{1A}$).
(S) In the optical axis perpendicular plane, the angles formed by each first beam portion 9B connected to a corresponding supporting portion 10A on the clockwise side in the rotation around optical axis LX and the corresponding supporting portion 10A are the same ($\theta_{1B} \neq \theta_{1A}$).
(T) In the optical axis perpendicular plane, the angles formed by each second beam portion 10B connected to a corresponding connecting portion 10C on the counterclockwise side in the rotation around optical axis LX and the corresponding connecting portion 10C are the same ($\theta_{2A}$).
(U) In the optical axis perpendicular plane, the angles formed by each second beam portion 10B connected to a corresponding connecting portion 10C on the clockwise side in the rotation around optical axis LX and the corresponding connecting portion 10C are the same ($\theta_{2B} \neq \theta_{2A}$).
(V) In a case where $L_{1A} > L_{1B}$ is satisfied, $L_{3A} > L_{3B}$, $\theta_{1A} > 120$ degrees $> \theta_{1B}$, and $\theta_{2A} > 120$ degrees $> \theta_{2B}$ are satisfied. In a case where $L_{1A} < L_{1B}$ is satisfied, $L_{3A} < L_{3B}$, $\theta_{1A} < 120$ degrees $< \theta_{1B}$, and $\theta_{2A} < 120$ degrees $< \theta_{2B}$ are satisfied.

In the optical device according to case 2 where the propositions (F) to (J) and (N) to (V) are true, three first supporting members 9 and three second supporting members 10 can support reflecting mirror 1 with rotational symmetry of 120 degrees.

FIGS. 12 to 16 illustrate reflecting mirror 1 supported by first supporting members 9 and second supporting members 10. FIGS. 12 to 16 are a perspective view, a front view, a right side view, a rear view, and a bottom view of reflecting mirror 1 supported by first supporting members 9 and second supporting members 10, respectively. As illustrated in FIGS. 12 to 16, reflecting mirror 1 is supported by a simple structure including first supporting members 9 and second supporting members 10. Supporting opening portion 8, first supporting members 9, and second supporting members 10 constitute a supporting opening portion that connects supported portion 4 to supporting board 6, fixing the position of supported portion 4 with respect to supporting board 6.

Y-axis member 12 is connected to an X-axis rotational member 14 (not illustrated). The X axis is an axis orthogonal to the Y axis in the plane perpendicular to optical axis LX. X-axis rotational member 14 is rotatable around the X axis. X-axis rotational member 14 has a shape similar to the shape of supporting board 6. X-axis rotational member 14 is rotatable around the X axis by two X-axis members 15 (not illustrated) parallel to the X axis. On a rear side of X-axis rotational member 14, a plate-shaped mirror base member 16 (not illustrated) having a protrusion to support X-axis member 15 is provided. The distance between mirror base member 16 and the X axis is determined appropriately so that X-axis rotational member 14 is rotatable around the X axis by a predetermined angle. Mirror base member 16 is fixed to a structure member of an optical telescope as described in a second embodiment.

As described above, it can be considered that optical device 50 having the mirror support mechanism according to the first embodiment includes a triangular structure formed by assembling the plate springs (first supporting members 9) into a triangle, and a triangular structure formed by the plate springs (second supporting members 10) disposed on the outer side of the triangular structure. That is, when imaginary lines are extended from one end and the other end of first beam portion 9B of first supporting member 9 connected to mirror supporting portion 9A, a triangle is formed. The triangle is desirably a regular triangle. Likewise, when imaginary lines are extended from one end and the other end of second beam portion 10B of second supporting member 10 connected to supporting portion 10A, a triangle is formed. The triangle is desirably a regular triangle.

The double triangular structure formed by the plate springs allows the mirror support mechanism to keep a position of a primary mirror unchanged by absorbing displacement (amount of deformation) caused by thermal deformation in not only the radial direction but also the circumferential direction with respect to relative thermal deformation between reflecting mirror 1 and the telescope structure at the time of temperature change. Furthermore, the double triangular structure formed by the plate springs can support the primary mirror ideally without causing a change in support reaction force. Further, the triangular shapes formed by the plate springs are arranged to face in alternate directions so as to have a structure like a truss. The mirror supporting portion and the supporting portion have the same position in the direction of optical axis LX. The mirror support mechanism has a uniform height so as to make both the surface facing to reflecting mirror 1 and the surface away from reflecting mirror 1 to be flat. Such structures make it possible to increase rigidity of the mirror support mechanism. Although there is a possibility that the rigidity is reduced, the mirror supporting portion and the supporting portion may be different from each other in position in the direction of optical axis LX.

A portion close to each vertex of the double triangular structure formed by the plate springs is cut out to form a hexagonal shape. This allows a reduction in size of the mirror support mechanism in the optical axis perpendicular plane.

With no connecting portion 10C provided, the end of second beam portion 10B that is not connected to supporting portion 10A may be supported by structure member 2. In PTL 1, the end of second beam portion 10B that is not connected to supporting portion 10A may be supported by cylindrical surface 13 that is the inner surface of supporting opening portion 8 provided in structure member 2 so that supporting beam 9 is supported by cylindrical surface 13 with beam fixing portion 10 interposed therebetween. In a case where no connecting portion 10C is provided, it is necessary to connect the ends of six second beams portion 10B to structure member 2, which increases the effort required for connection. Further, in order to arrange the connection position where the end of second beam portion 10B is connected to structure member 2 at a desired position, more members are required or the structure becomes complicated, and thus at least one of cost, labor, or mounting accuracy deteriorates as compared with the case where connecting portion 10C is provided. With a connecting portion formed separately from the second supporting member, the ends, which are located adjacent to each other, of two second beam portions 10B may be connected to the connecting portion, and the connecting portion may be fixed to fixing portion 2A. It is only required that the end of second beam portion 10B that is not connected to supporting portion 10A is supported by structure member 2.

For optical device 50, the following propositions are true.

(W) The length ($L_1$) of each first beam portion 9B is longer than the length ($L_2$) of each supporting portion 10A ($L_1 > L_2$).

(X) The length ($L_3$) of each second beam portion 10B is longer than the length ($L_4$) of each connecting portion 10C ($L_3 > L_4$).

Since the proposition (W) is true, the maximum displacement amount that can be absorbed by first supporting member 9 can be increased with respect to the radial displacement of the position where mirror supporting portion 9A supports supported surface 5. In a case of the radial displacement of the same magnitude, the amount of deformation of first supporting member 9 becomes small. When the proposition (W) is not true, the first hexagonal shape can be made closer to a regular hexagon, and the mirror support mechanism can be made more compact.

Since the proposition (X) is true, the maximum deformation amount that can be absorbed by second supporting member 10 can be increased with respect to the amount of deformation in the circumferential direction of first supporting member 9. In a case of displacement of the same magnitude in the circumferential direction, the amount of deformation of second supporting member 10 becomes small. When the proposition (X) is not true, the second hexagonal shape can be made closer to a regular hexagon, and the mirror support mechanism can be made more compact.

The lengths of mirror supporting portion 9A, first beam portion 9B, supporting portion 10A, second beam portion 10B, and connecting portion 10C are determined appropriately in consideration of an assumed maximum deformation amount, restrictions on the size of the mirror support mechanism, and the like.

In each first supporting member 9, mirror supporting portion 9A and first beam portions 9B on both sides of mirror supporting portion 9A are arranged in one straight line as viewed from the direction of optical axis LX. In each second supporting member 10, supporting portion 10A and second beam portions 10B on both sides of supporting portion 10A are arranged in one straight line as viewed from the direction of optical axis LX. The mirror support mechanism can support supported portion 4 of reflecting mirror 1 with a reduced load applied to supported portion 4. Although the effect of the triangular structure formed by the plate springs is reduced, one or both of first supporting member 9 and second supporting member 10 may be arranged in a polygonal line as viewed from the direction of optical axis LX. In a case of the polygonal line, a side facing to supported portion 4 may be either convex or a concave. In a case where both first supporting member 9 and second supporting member 10 have a polygonal line shape, the bending direction of first supporting member 9 and the bending direction of second supporting member 10 may be the same or different.

In the mirror support mechanism (optical device) according to the first embodiment, the plate springs (first supporting members 9) are assembled into a triangle, and the triangular structure of the plate springs (second supporting members 10) is disposed on the outer side of the triangle. In the mirror support mechanism (optical device) according to the first embodiment, first supporting members 9 and second supporting members 10 can keep the position of reflecting mirror 1 unchanged by absorbing thermal deformation of reflecting mirror 1 in not only the radial direction but also the circumferential direction with respect to relative thermal deformation between reflecting mirror 1 and the telescope structure at the time of temperature change. The mirror support mechanism (optical device) according to the first embodiment can support reflecting mirror 1 ideally without giving reflecting mirror 1 any variation in support reaction force.

A device including the mirror support mechanism according to the first embodiment and reflecting mirror 1 may be referred to as an optical device in the first embodiment. A device including the mirror support mechanism according to the first embodiment, reflecting mirror 1, and structure member 2 may be referred to as an optical device in the first embodiment. As described above, it is desirable that supported portion 4 is a protrusion having a cylindrical outer shape, and supported surface 5 is a flat surface parallel to the optical axis.

It is conceivable to reduce the amount of deformation of the mirror support mechanism caused by a temperature change by making the mirror support mechanism using a metal having a low thermal expansion coefficient. Herein, a metal that is used for fabricating the optical device and is lower in absolute value of thermal expansion coefficient than carbon fiber reinforced plastic (abbreviated as CFRP) is referred to as a low expansion metal. In the mirror support mechanism according to the first embodiment, structure member 2, first supporting member 9, and second supporting member 10 may be made of the low expansion metal. An object made of the low expansion metal may include at least one of structure member 2, first supporting member 9, or second supporting member 10. Further, a different material (for example, metal) may be used for structure member 2, first supporting member 9, and second supporting member 10. Further, at least one of supporting board 6 or bearing part 7 provided in structure member 2 may be made of the low expansion metal.

Structure member 2 illustrated in the drawings has an illustrated configuration and includes no honeycomb sandwich panel 20. Supporting board 6 and bearing part 7 of structure member 2 may include honeycomb sandwich panel 20 made of a metal having a low thermal expansion coefficient so as to be lightweight and to have a low thermal expansion coefficient. As a metal having a low thermal expansion coefficient, an invar alloy is used. For example, "zero thermal expansion invar alloy" fabricated by Shinhokoku Material Corp. has an extremely low thermal expansion coefficient of 0.06 ppm [1/K] (according to an article of Japan Metal Daily dated on Nov. 22, 2018). A metal (low expansion metal) having an absolute value of thermal expansion coefficient smaller than an absolute value of thermal expansion coefficient of CFRP, even when absolute value of thermal expansion coefficient is higher than the absolute value of thermal expansion coefficient of "zero thermal expansion invar alloy", enables to provide an optical device with reduced influence of thermal expansion, as compared with a case where CFRP is used. Supporting opening portion 8, first supporting member 9, and second supporting member 10 are made of the low expansion metal. At least any one of supporting opening portion 8, first supporting member 9, and second supporting member 10 may be made of a material different from the low expansion metal.

Figure 17:
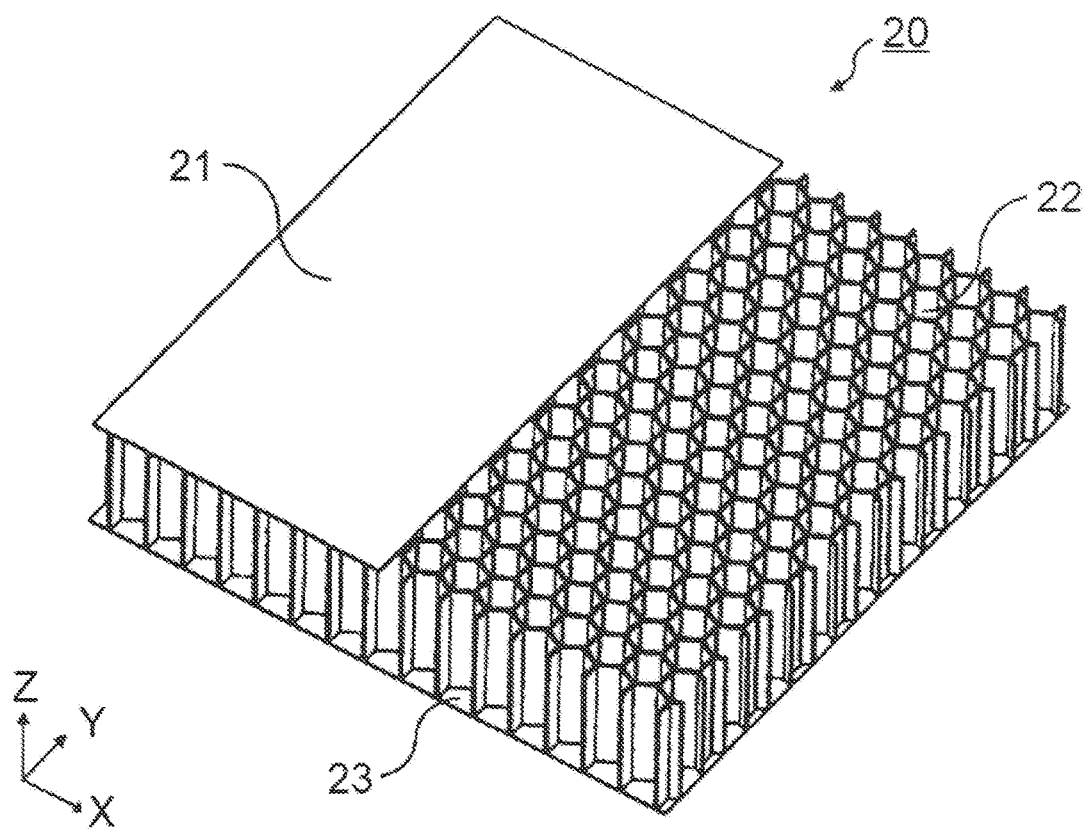
FIG. 17 is a perspective view of a honeycomb sandwich panel used in the optical device according to the first embodiment with a skin partially removed.

With reference to FIG. 17, a structure of honeycomb sandwich panel 20 is described. FIG. 17 is a perspective view of the honeycomb sandwich panel in a state in which a part of a skin is removed. Honeycomb sandwich panel 20 includes a first skin 21, a core 22, and a second skin 23. First skin 21 is a plate material forming one surface of honeycomb sandwich panel 20. Second skin 23 is a plate material forming the other surface to face the one surface. In honeycomb sandwich panel 20 illustrated in FIG. 17, first skin 21 and second skin 23 are arranged in parallel to each other.

Core 22 is a member having a honeycomb structure. The honeycomb structure is a structure in which a plurality of tubular cells each having a hexagonal (desired to be regular hexagonal) cross section are formed adjacently to each other. Core 22 is bonded perpendicularly to first skin 21 and second skin 23 with an adhesive. Tubular cells each having a hexagonal cross section of which two opposite sides of the six sides have a different length from a length of the other four sides can be arranged in a plane without leaving uncovered area. The core may therefore have a shape in which tubular cells each having a hexagonal cross section are arranged adjacently to each other.

Structure member 2 may be fabricated by using a honeycomb sandwich panel made of the low expansion metal. Accordingly, the degree of influence, on the position of reflecting mirror 1, of expansion or contraction caused by a temperature change can be reduced, compared to the mirror supporting member made of CFRP. Y-axis member 12, X-axis rotational member 14, X-axis member 15, and mirror base member 16 are also fabricated to include a honeycomb sandwich panel made of the low expansion metal, or are made of the low expansion metal.

Structure member 2 may be fabricated by using a honeycomb sandwich panel made of a material not being the low expansion metal, or may be fabricated without using a honeycomb sandwich panel. The same applied as well to each of Y-axis member 12, X-axis rotational member 14, X-axis member 15, and mirror base member 16.

The following problems that occur when CFRP is used can be solved by using the low expansion metal instead of CFRP.

A honeycomb sandwich panel for which CFRP is used varies in nature of stiffness and/or thermal expansion coefficient, depending on the direction of fibers and/or the layer structure. It is therefore necessary to consider and adjust the fiber direction and/or the layer structure before fabricating the skin and the core. As a result, a honeycomb sandwich panel made of CFRP requires more than a honeycomb sandwich panel made of the low expansion metal, in terms of at least one of effort, time, and cost.

In order to bond honeycomb sandwich panels both made of CFRP, or bond a honeycomb sandwich panel and another member, adhesive or insert is required to be used. It is therefore difficult for a honeycomb sandwich panel made of CFRP to increase bonding strength sufficiently.

The absolute value of thermal expansion coefficient that can be achieved by CFRP is less than $10^{-6}$ and approximately $3 \times 10^{-7}$ [1/K] or more. A low expansion glass material, for example, ZERODUR® Class 1 of Schott AG, has a thermal expansion coefficient of $0 \pm 0.05 \times 10^{-6}$ [K/1]. Compared to a reflecting mirror made of a low expansion glass material having a thermal expansion coefficient of less than $10^{-7}$ [1/K], the thermal expansion coefficient of CFRP that is a material to be made for the mirror supporting member is at least five times as high as the thermal expansion coefficient of the low expansion glass material of the reflecting mirror. When the mirror supporting member made of CFRP is used, a complicated structure is necessary to prevent deformation of the mirror supporting member made of CFRP from being transferred to optical elements.

To use CFRP for making an optical device to be used in space, there are some points to be considered. CFRP is a polymeric organic material and therefore is hygroscopic. If the optical device is launched into an orbit with CFRP containing moisture, the moisture may be evaporated in space to cause contraction deformation of CFRP. The organic component contained in CFRP may also be evaporated in space to cause contraction deformation. The contraction deformation of CFRP may cause the dimensions of the structural member to vary and cause the relative position of the optical instrument to be changed, resulting in deterioration of the observation accuracy. Gas containing the organic component generated from CFRP (outgas) may be brought into contact with the optical instrument and the organic component generated from CFRP may adhere to the optical instrument. Adhesion of the organic component may deteriorate the observation accuracy.

The low expansion metal has high stiffness and high strength, and has isotropy with respect to stiffness and thermal expansion. The low expansion metal has a higher thermal conductivity than CFRP.

Structure member 2 can be made of the low expansion metal such as "Zero Thermal Expansion Invar" to achieve a low thermal expansion coefficient of less than $10^{-7}$ [1/K]. Therefore, a difference in thermal expansion coefficient between a portion corresponding to the support structure and reflecting mirror 1 is small, and reflecting mirror 1 can be fixed to structure member 2 with three first supporting members 9 and three second supporting members 10. An optical instrument such as reflecting mirror 1 can be supported by a simple structure including first supporting members 9 and second supporting members 10. The structure supporting the optical instruments can be made of the low expansion metal, to reduce the amount of deformation and the weight, as compared with using CFRP.

The low expansion metal can be processed through cutting, welding, or the like. Because the low expansion metal is a material that can be processed, it is unnecessary to take into consideration the fiber direction and/or the layer structure which must be considered for CFRP. Compared to fabricating an optical device using CFRP, fabricating an optical device with the low expansion metal can improve at least one of effort, time, and cost. As a connection method, welding providing higher strength than adhesive can be used for the low expansion metal. The low expansion metal is welded by a method that does not cause deformation of the honeycomb sandwich panel.

In the honeycomb sandwich panel, the first skin and the second skin may be made of the low expansion metal, and the core may be made of CFRP. For a honeycomb sandwich panel in which the first skin and the second skin are made of "Zero Thermal Expansion Invar" and the core is made of CFRP, deformation of the honeycomb sandwich panel with respect to a temperature change is simulated through finite-element analysis. As to the shape of the honeycomb sandwich panel, each of the first skin and the second skin is a plate material having a length (Y direction) and a width (X direction) of 100 mm×100 mm and a thickness of 1 mm. The core had a cell size of about 6 mm, a thickness of the core cell wall of about 0.03 mm, and a height (Z direction) of 20 mm. The thermal expansion coefficient of "Zero Thermal Expansion Invar" is $5.0 \times 10^{-8}$ [1/K], and the thermal expansion coefficient of CFRP is $-3.0 \times 10^{-7}$ [1/K]. The temperature change is set to an increase of 10 [K].

As a result of the simulation, an X direction displacement and a Y direction displacement of $5.0 \times 10^{-5}$ [mm] and a Z direction displacement of $1.0 \times 10^{-5}$ [mm] are obtained to the honeycomb sandwich panel in which the first skin, the second skin, and the core are made of "Zero Thermal Expansion Invar." An X direction displacement of $4.92 \times 10^{-5}$ [mm], a Y direction displacement of $5.16 \times 10^{-5}$ [mm] and a Z direction displacement of $-8.28 \times 10^{-5}$ [mm] are obtained to the honeycomb sandwich panel in which the core is made of CFRP. The honeycomb sandwich panel in which the core is made of CFRP is deformed in a wavy shape, and therefore, the amount of displacement is measured at a portion having the largest displacement. This simulation result indicates that the honeycomb sandwich panel in which the first skin and the second skin are made of "Zero Thermal Expansion Invar" has, even when the core is made of CFRP, a thermal expansion coefficient in a plane parallel to the skins that is substantially identical to that of the honeycomb sandwich panel in which the skins and the core are made of "Zero Thermal Expansion Invar."

For supporting an optical instrument different from the optical instrument having the reflecting mirror, a honeycomb sandwich panel made of a low expansion metal can be used.

In optical device 50, structure member 2 supports supported portion 4 of reflecting mirror 1 using three first supporting members 9 and three second supporting members 10. The three-point support achieved by three first supporting members 9 and three second supporting members 10 allows structure member 2 to support reflecting mirror 1 without over-constraint. Supported portion 4 is supported at three supported surfaces 5 in a point symmetrical manner with respect to optical axis LX. First supporting members 9 and second supporting members 10 support supported portion 4 in a plane symmetrical manner with respect to central plane CS. Therefore, neither first supporting member 9 and second supporting member 10 nor structure member 2 does not hinder reflecting mirror 1 from expanding or contracting, which is caused by a temperature change, in a point symmetrical manner with respect to optical axis LX. Moreover, because of the difference in thermal expansion coefficient, even when first supporting members 9 and structure member 2 are expanded or contracted with respect to reflecting mirror 1, first supporting members 9 and second supporting members 10 are expanded or contracted similarly, so that stress acting on reflecting mirror 1 at the three points are point symmetrical with respect to optical axis LX.

Furthermore, because first supporting members 9 and second supporting members 10 are plane symmetrical with respect to respective central planes CS crossing the three points, the stresses acting on reflecting mirror 1 act on respective central planes CS. Respective stresses applied to reflecting mirror 1 by three first supporting members 9 and three second supporting members 10 have the same magnitude. As a result, expansion or contraction of structure member 2 does not cause the positions where reflection mirror 1 is supported by first supporting members 9 and second supporting members 10 to be changed. When reflecting mirror 1 is expanded or contracted due to expansion or contraction of structure member 2, reflecting mirror 1 is expanded or contracted in a point symmetrical manner with respect to optical axis LX.

Supported portion 4 is provided near optical axis LX of reflecting mirror 1. Therefore, even when expansion or contraction occurs due to a temperature change, the amount of expansion or contraction of first supporting members 9 and second supporting members 10 which support supported portion 4 can be made small than that when supported portion 4 is supported near the outer edge of reflecting mirror 1. Accordingly, the stress applied to reflecting mirror 1, first supporting members 9, and second supporting members 10 due to expansion or contraction is also made smaller. Structure member 2, first supporting members 9, and second supporting members 10 that are made of the low expansion metal enable further reduction of the amount of expansion or contraction as well as reduction of the stress. Even when the stress acting on supported portion 4 varies, the stress acts on the three points that exist close to each other, and therefore, the stress does not influence the mirror surface precision of reflecting surface 3 of reflecting mirror 1. As described above, optical device 50 can deal with a relative difference in thermal expansion coefficient between reflecting mirror 1 and structure member 2.

The supported surface may not be parallel to optical axis LX of reflecting mirror 1. The supported surface may not be a flat surface. The supported surface may have a protrusion or a recess. The supported surfaces may be provided at least to have rotational symmetry of 120 degrees around optical axis LX.

An optical telescope including optical device 50 can be mounted and used on an artificial satellite. When the artificial satellite on which the optical telescope is mounted is launched, the optical telescope and other parts are subjected to acceleration.

First supporting members 9 and second supporting members 10 can support reflecting mirror 1 even under a situation in which the acceleration is applied to. When the artificial satellite is launched, reflecting mirror 1 takes a posture with optical axis LX parallel to the direction of motion. Specifically, the acceleration when the artificial satellite is launched is generated in the direction parallel to optical axis LX of reflecting mirror 1. First beam portion 9B of first supporting member 9 is perpendicular to the direction in which the acceleration is generated, so that stress against the acceleration can be generated by first beam portion 9B.

The foregoing is also applied to other embodiments.

Second Embodiment

Figure 18:
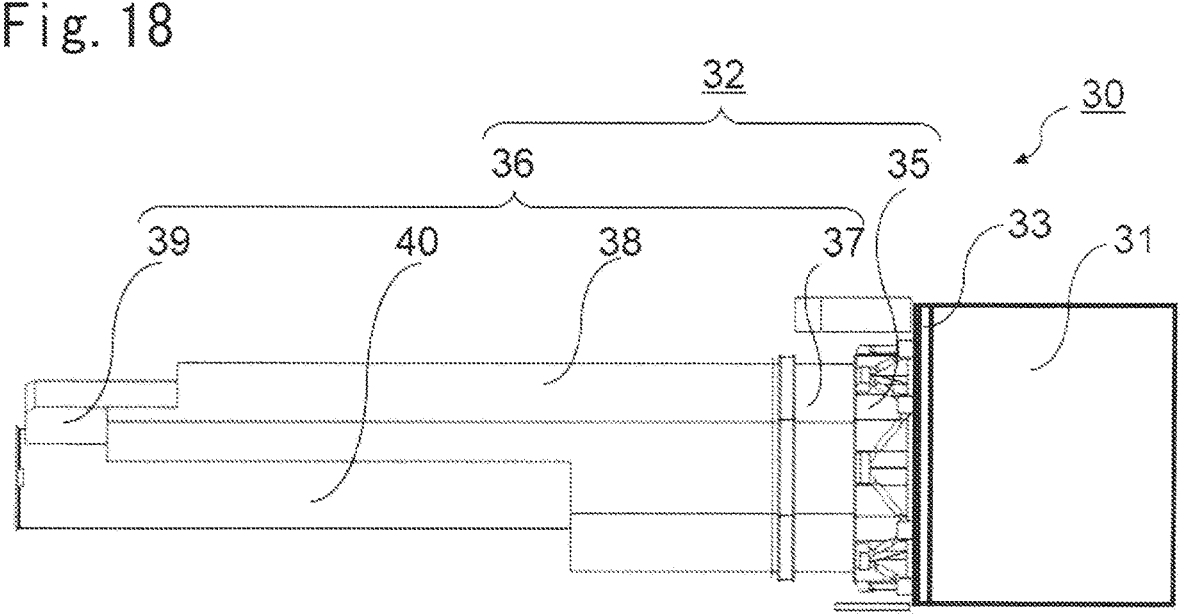
FIG. 18 is a front view of an artificial satellite equipped with an optical device according to a second embodiment.
Figure 19:
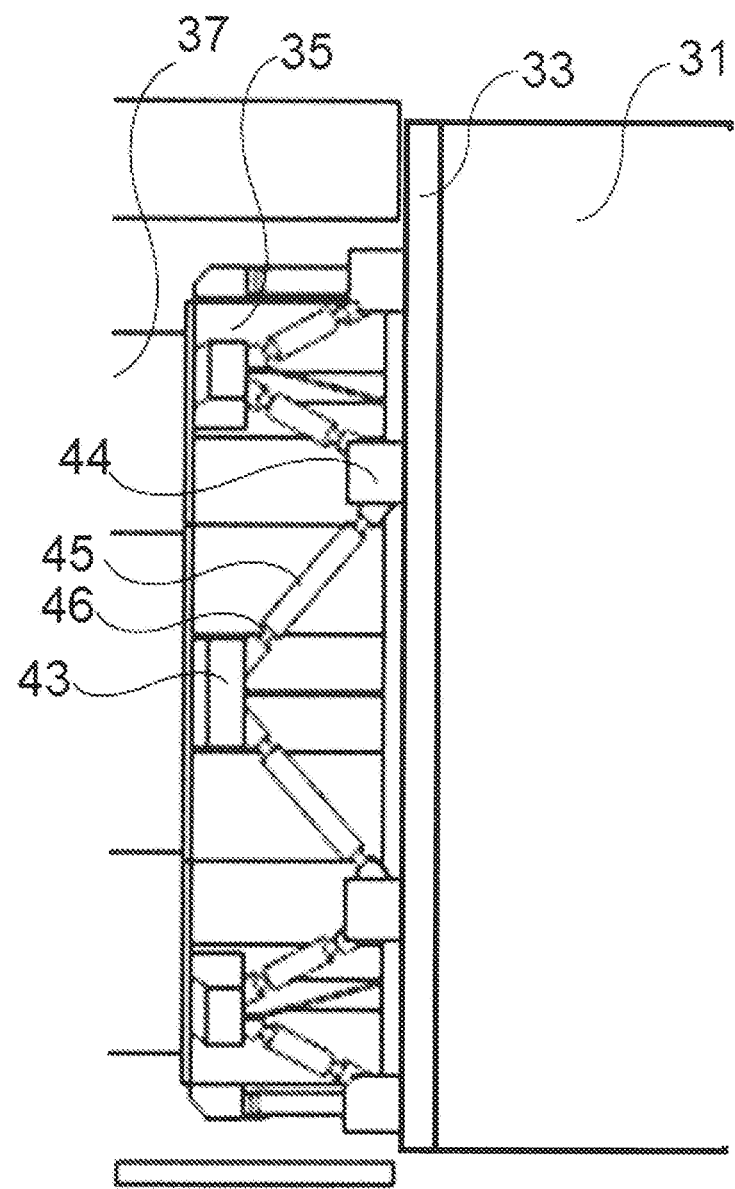
FIG. 19 is an enlarged view of a portion where the optical device according to the second embodiment and the artificial satellite are connected.
Figure 20:
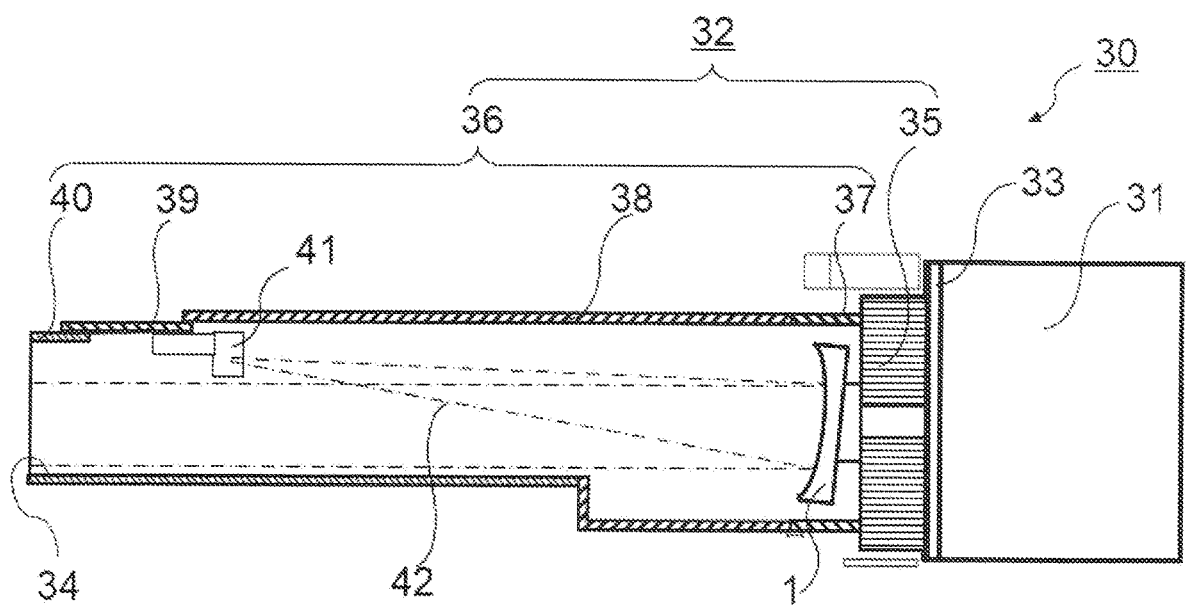
FIG. 20 is a conceptual cross-sectional view for describing an internal configuration of the optical device according to the second embodiment.

With reference to FIGS. 18 to 20, an artificial satellite according to the second embodiment, that is, an artificial satellite equipped with an optical device according to the second embodiment is described. The optical device referred herein is, for example, the optical device according to the first embodiment. FIG. 18 is a front view of the artificial satellite on which the optical device is mounted according to the second embodiment. FIG. 19 is an enlarged view of a portion where the optical device and the artificial satellite are connected to each other. FIG. 20 is a conceptual cross-sectional view illustrating an internal configuration of the optical device. The mirror support mechanism (optical device) according to the first embodiment corresponds to a portion called a tilting mechanism of a telescope structure of an optical telescope 32. The tilting mechanism is a member installed for the purpose of rotating the primary mirror around two axes to scan the face of the sun.

An artificial satellite 30 includes a satellite body 31 and an optical telescope 32. Optical telescope 32 is fabricated with consideration given so that a part(s) of the optical telescope that influences the observation accuracy has a low thermal expansion coefficient. Satellite body 31 is fabricated with no special consideration given to thermal expansion. Satellite body 31 has a connecting panel 33 for mounting optical telescope 32 thereon. Connecting panel 33 is a flat plate-shaped member. Connecting panel 33 is fabricated using a honeycomb sandwich panel made of a metal such as aluminum.

Optical telescope 32 has a structure in which a circular entrance 34 (shown in FIG. 20) is provided at the side relatively farther from satellite body 31, and a reflecting mirror 1 is provided at the side relatively closer to satellite body 31. Regarding optical telescope 32, the side where entrance 34 exists is referred to herein as top side, and the side connected to satellite body 31 is referred to herein as bottom side. Optical telescope 32 is roughly divided into a base 35 and a lens barrel 36. Base 35 is provided on the bottom side and connected to connecting panel 33. Reflecting mirror 1 is mounted on base 35. Lens barrel 36 is a member surrounding an optical path 42 (shown in FIG. 20) in which observation light travels. Lens barrel 36 is connected at the bottom side to base 35.

Base 35 is in the shape of a disc having a through hole at the center. In the through hole, a line for transmitting an observed image to a memory provided inside satellite body 31, a signal line for transmitting a signal for controlling optical telescope 32, and the like, are passed. Base 35 is fabricated by using a honeycomb sandwich panel made of the low expansion metal. A supporting member of reflecting mirror 1 is fixed to base 35. Reflecting mirror 1 is supported on the supporting member so that the orientation of the optical axis can be changed.

Lens barrel 36 is connected perpendicularly to base 35. Lens barrel 36 includes a lens barrel bottom portion 37, a lens barrel middle portion 38, an instrument holding portion 39, and an optical path barrel portion 40. Lens barrel bottom portion 37 is in the shape of a polygonal tube having a smaller height compared to the width. The cross-sectional shape of lens barrel bottom portion 37 is a regular octagon. Lens barrel bottom portion 37 is fixed to base 35. Lens barrel bottom portion 37 has reflecting mirror 1 contained therein. Lens barrel bottom portion 37 has a flange at its top side. Lens barrel bottom portion 37 is fabricated by using a honeycomb sandwich panel made of the low expansion metal.

The bottom side of lens barrel middle portion 38 is a polygonal tube having a flange and a cross-sectional shape of a regular octagon. The top side of lens barrel middle portion 38 has a shape being only the upper half of the polygonal tube. As shown in FIG. 18, optical path barrel portion 40 is connected to the lower side and the top side, as seen in the drawing, of lens barrel middle portion 38. The top side of optical path barrel portion 40 is a cylinder. The top-side opening of the cylinder is entrance 34. The bottom side of optical path barrel portion 40 is only the lower half of the cylinder so that lens barrel middle portion 38 can be connected to the upper side. Lens barrel middle portion 38 and optical path barrel portion 40 are bonded to each other so that no gap is left therebetween. To the top side of the upper portion of lens barrel middle portion 38, instrument holding portion 39 is connected. Instrument holding portion 39 is provided on the upper side of optical path barrel portion 40 and the top side of lens barrel middle portion 38. Instrument holding portion 39 holds an optical instrument. Lens barrel middle portion 38 and instrument holding portion 39 are fabricated by using a honeycomb sandwich panel made of the low expansion metal. Optical path barrel portion 40 is made of aluminum.

Lens barrel bottom portion 37, lens barrel middle portion 38, instrument holding portion 39, and optical path barrel portion 40 are bonded to base 35 to form a closed space that allows observation light to enter only through entrance 34. In the closed space inside the lens barrel, an optical instrument is provided. In FIG. 20, only a slit 41 that disperses observation light is drawn. An optical instrument such as camera is also provided inside the lens barrel. Light entering from entrance 34 into the lens barrel is reflected by reflecting mirror 1. The light reflected by reflecting mirror 1 is dispersed by slit 41. Dispersed light having a specific wavelength enters the camera (not shown) and the camera captures an image of an object to be observed.

Optical path 42 is a path in which light travels from entrance 34 to slit 41. In FIG. 20, optical path 42 is indicated by a dot-dash line. It is desirable in the optical telescope that optical path 42 is kept to be the same regardless of the temperature. In optical telescope 32, base 35, lens barrel bottom portion 37, lens barrel middle portion 38, and instrument holding portion 39 are fabricated by using a honeycomb sandwich panel made of a low expansion metal having an absolute value of thermal expansion coefficient smaller than $1.0 \times 10^{-7}$ [1/K], or using a member made of the low expansion metal. It is therefore possible to restrict a change of the relative positional relation between reflecting mirror 1 and slit 41 to be small, even in a case where a temperature change occurs. As a result, a change of the focal position of optical telescope 32 can be kept within an allowable range, even in the case where the temperature change occurs. A change of the position of any optical instrument other than slit 41, with respect to reflecting mirror 1, can also be kept within an allowable range, even in the case where the temperature change occurs.

As a result, a change of an image obtained for observation can be kept small, even in the case where the temperature change occurs. When a structural member supporting optical instruments such as reflecting mirror 1 and slit 41 is made of a material having a high thermal expansion coefficient, the distance between the optical instruments may be changed due to a temperature change, which may result in displacement of the focal position. The displacement of the focal position causes an image captured by a camera, for example, to be unclear. When a material having a high thermal expansion coefficient is used, an adjusting mechanism having a large stroke or the like may additionally be necessary, to keep the focal position unchanged. The honeycomb sandwich panel can reduce the weight, and can reduce the amount of energy required for launching artificial satellite 30 into space.

Optical telescope 32 which is an optical device includes a plurality of optical instruments and structure members supporting the optical instruments. Example of the optical instruments include reflecting mirror 1 and slit 41. Base 35 is a structure member supporting structure member 2. Structure member 2 is a structure member supporting reflecting mirror 1. For example, as described in the first embodiment, it is preferable that the mirror support mechanism have a configuration where supported surface 5 is supported by mirror supporting portion 9A formed in first supporting member 9, supporting portion 10A formed in second supporting member 10 is connected to first supporting member 9, and connecting portion 10C formed in second supporting member 10 is connected to structure member 2 provided on the rear side of reflecting mirror 1. The mirror support mechanism is provided on the rear surface being a surface of the reflecting mirror existing on the contrary side to reflecting surface 3 that reflects light to support reflecting mirror 1 including supported portion 4 having three supported surfaces 5 provided with rotational symmetry of 120 degrees around the optical axis.

Lens barrel 36 is a structure member that surrounds the optical path in which the observation light travels, is connected to base 35, and supports slit 41. Lens barrel 36 supports an optical instrument(s) in addition to slit 41 (not shown). Each of structure member 2, base 35, and lens barrel 36 includes a honeycomb sandwich panel made of the low expansion metal. In the path passing the structural members connecting reflecting mirror 1 to slit 41, there exist only the structural members made of the low expansion metal or fabricated by using honeycomb sandwich panels made of the low expansion metal. It is therefore possible to restrict a change of the relative positional relation between reflecting mirror 1 and slit 41 within an allowable range with respect to a temperature change. In the path between the optical instruments, a structural member made of a material other than the low expansion metal may be included.

In the path of the structural member existing between optical instruments, the ratio of the honeycomb sandwich panel made of the low expansion metal or the ratio of a structural member made of the low expansion metal may be a predetermined lower limit or more. In the case of an optical device having three or more optical instruments, for all combinations each being a combination of two optical instruments selected from these optical instruments, the ratio of the honeycomb sandwich panel made of the low expansion metal or the ratio of a part made of the low expansion metal in the structural member existing in the path passing the structural member connecting one of the two optical instruments to the other of the two optical instrument, is determined to be a predetermined lower limit or more.

Base 35 is made of the low expansion metal, and connecting panel 33 is made of a metal having a higher thermal expansion coefficient than the thermal expansion coefficient of the low expansion metal. A structure absorbing a difference in amount of expansion or contraction between connecting panel 33 and base 35, due to a temperature change, is described. Base 35 is connected to connecting panel 33 by a supporting mechanism having rotational symmetry of 45 degrees with respect to its center. A rectangular parallelepiped protrusion 43 is provided at the center at the top side of each external surface of base 35 having an outer shape of a regular octagonal prism. Protrusion 43 is fixed to an extended portion of the skin of one surface of a honeycomb sandwich panel used to form base 35, and to a side surface of base 35. A prism-shaped protrusion 44 is provided also on connecting panel 33. One protrusion 43 and each of protrusions 44 on the both sides are connected by a single cylindrical rod 45. By two rods 45 connected to a single protrusion 43, this protrusion 43 is supported through a bipod structure (two legs).

The surface of protrusion 43 to which one end of rod 45 is fixed is a surface perpendicular to the outer side surface of base 35. The other end of rod 45 is fixed to a side surface of protrusion 44. The side surface of protrusion 44 to which the other end of rod 45 is fixed is orthogonal to a plane in which rod 45 exists and which is parallel to the optical axis. As seen in the direction parallel to the optical axis, protrusion 44 has an outer shape of a trapezoid. The other end of rod 45 may be fixed to the upper surface of protrusion 44 (the surface existing on a side where protrusion 43 exists). Base 35 and connecting panel 33 are connected to each other by rods 45 only. A space is present between base 35 and connecting panel 33.

Each of eight protrusions 43 is connected to adjacent protrusions 44 by two rods 45. The total number of rods 45 is sixteen. The sixteen rods 45, the eight protrusions 43, and the eight protrusions 44 constitute an optical instrument connecting portion that connects optical telescope 32 to satellite body 31, allowing the position of optical telescope 32 with respect to satellite body 31 to be changed in response to a temperature change. Optical telescope 32 may be connected to satellite body 31, allowing the position of optical telescope 32 with respect to satellite body 31 to be changed in response to a temperature change, by a method other than the method using rods 45.

At the both ends of rod 45, reduced-diameter portions 46 having a relatively smaller diameter are provided. The portion of rod 45 sandwiched between reduced-diameter portions 46 is referred to herein as rod main body. Reduced-diameter portions 46 at the both ends have the same shape. In reduced-diameter portion 46, the cross section perpendicular to the axial direction of rod 45 is concentric and circular, and only the diameter decreases toward an end. In reduced-diameter portion 46, the diameter decreases to be a minimum diameter and then increases toward the end of rod 45. The presence of reduced-diameter portion 46 allows the angle at which rod 45 is connected to protrusion 43 to be changed and the angle at which rod 45 is connected to protrusion 44 to be changed. Thus, rods 45 can form a truss structure in which the angle at which the rod is connected is variable. Sixteen rods 45 form a truss structure. The number of rods may be larger or smaller than sixteen. The cross section of the lens barrel may not be octagonal.

The length of rod 45 is set to an appropriate length so that a space can be formed between base 35 and connecting panel 33 even in a case where a temperature change occurs. Base 35, connecting panel 33, protrusion 43, and protrusion 44 have sufficient strength not to be deformed in response to a temperature change. Reduced-diameter portion 46 of rod 45 is slightly bent with respect to the rod main body when a temperature change occurs. The material and/or the shape of rod 45 is determined so that rod 45 has required and sufficient strength for not being damaged when rod 45 is bent.

When heat is applied through irradiation with sunlight in space for example and accordingly the temperature increases, connecting panel 33 expands to a greater extent than base 35. Rod 45 is slightly bent at reduced-diameter portion 46, and the angle of the rod main body of rod 45 with respect to connecting panel 33 is decreased. When the temperature decreases, connecting panel 33 contracts to a greater extent than base 35. Rod 45 is slightly bent in the direction opposite to the direction in which rod 45 is bent upon temperature increase, and the angle of the rod main body of rod 45 with respect to connecting panel 33 is increased. In this way, rod 45 absorbs the difference in expansion or contraction amount due to the difference in thermal expansion coefficient between connecting panel 33 and base 35.

When rod 45 is made of a material having a thermal expansion coefficient equal to or slightly smaller than the thermal expansion coefficient of connecting panel 33, rod 45 itself expands or contracts, so that the change of the angle at which rod 45 is bent at reduced-diameter portion 46 can be made smaller than that in the case where rod 45 is made of the low expansion metal.

The structural member supporting the optical instruments can be fabricated by using a honeycomb sandwich panel made of the low expansion metal, or fabricated by using a processed member made of a low expansion metal, to reduce the amount of change in relative positional relation between the optical instruments caused by a temperature change, as compared with the structural member made of CFRP. Change of the observation performance of an optical device such as optical telescope can be reduced, even if a temperature change occurs. Moreover, the optical device is not required to have a mechanism, such as focal position adjustment mechanism, for example, which is necessary for the optical device in the case where the structural member has a large absolute value of thermal expansion coefficient, and which prevents a change of the relative positional relation between optical instruments due to a temperature change, from affecting the observation accuracy.

The embodiments can be combined freely, or each embodiment can be modified and/or a part of the embodiment can be omitted.

REFERENCE SIGNS LIST

50: optical device
1: reflecting mirror (optical instrument)
2: structure member (mirror supporting member)
2A: fixing portion
3: reflecting surface
4: supported portion
5: supported surface
6: supporting board (main body)
7: bearing part
8: supporting opening portion
9: first supporting member
9A: mirror supporting portion
9B: first beam portion
10: second supporting member
10A: supporting portion
10B: second beam portion
10C: connecting portion
11: shaft holding hole
12: Y-axis member
13: cylindrical surface
14: X-axis rotational member
15: X-axis member
16: mirror base member
20: honeycomb sandwich panel
21: first skin
22: core
23: second skin
30: artificial satellite
31: satellite body
32: optical telescope (optical device)
33: connecting panel
34: entrance
35: base (structure member)
36: lens barrel (structure member)
37: lens barrel bottom portion
38: lens barrel middle portion
39: instrument holding portion
40: optical path barrel portion
41: slit (optical instrument)
42: optical path
43: protrusion (optical instrument connecting portion)
44: protrusion (artificial satellite connecting portion)
45: rod (optical instrument connecting portion)
46: reduced-diameter portion
LX: optical axis
CS: central plane

The invention claimed is:

1. A mirror support mechanism comprising:
three first supporting members each including a mirror supporting portion and two first beam portions, the mirror supporting portion being in contact with a corresponding one of three supported surfaces to support the corresponding supported surface, the three supported surfaces being provided on a side surface of a supported portion of a reflecting mirror with rotational symmetry of 120 degrees around an optical axis, the reflecting mirror including a reflecting surface to reflect light and the supported portion being protrusion provided at a center of a rear surface being a surface of the reflecting mirror existing on the contrary side to the reflecting surface, and the two first beam portions each being connected to each side of the mirror supporting portion, the three first supporting members each being arranged in one straight line or a polygonal line as viewed from the direction of an optical axis; and
three second supporting members each including a supporting portion to which ends of two of the three first beam portions are connected, the ends being located adjacent to each other, each of the ends being not connected to the mirror supporting portion, and two second beam portions each being connected to each side of the supporting portion, and an end of the second beam portion not connected to the supporting portion being supported by a structure member provided on the rear side of the reflecting mirror, the three second supporting members each being arranged in one straight line or a polygonal line as viewed from the direction of the optical axis.

2. The mirror support mechanism according to claim 1, further comprising three connecting portions each connected to a corresponding one of three fixing portions provided in the structure member, and to which ends of two of the three second beam portions are connected, the ends being located adjacent to each other, each of the ends being not connected to the supporting portion.

3. The mirror support mechanism according to claim 2, wherein each connecting portion has a same length.

4. The mirror support mechanism according to claim 3, wherein
each second beam portion has a same length and
each second beam portion is longer than the connecting portions.

5. The mirror support mechanism according to claim 2, wherein
the first supporting members have a shape formed by plate members connected to each other,
the second supporting members have a shape formed by plate members connected to each other,
the mirror supporting portion is thicker than a portion of the first supporting members connected to the mirror supporting portion,
the supporting portion is thicker than a portion of the second supporting members connected to the supporting portion, and
the connecting portions are thicker than a portion of the second supporting members connected to the connecting portions.

6. The mirror support mechanism according to claim 1, wherein
each second beam portion has a same length.

7. The mirror support mechanism according to claim 1, wherein each mirror supporting portion has a same length, each first beam portion has a same length, and each supporting portion has a same length.

8. The mirror support mechanism according to claim 7, wherein the first beam portion is longer than the supporting portion.

9. The mirror support mechanism according to claim 1, wherein an outer shape of the three first supporting members and three of the supporting portions as viewed from a direction of the optical axis is a first hexagonal shape, and
in the first hexagonal shape, all interior angles are equal to one another.

10. The mirror support mechanism according to claim 1, wherein an outer shape of the three first supporting members as viewed from a direction of the optical axis is a second hexagonal shape, and
the second hexagonal shape is a hexagonal shape in which all interior angles are equal to one another.

11. The mirror support mechanism according to claim 1, further comprising the structure member.

12. The mirror support mechanism according to claim 11, wherein the second supporting member is formed integrally with the structure member.

13. The mirror support mechanism according to claim 11, wherein the structure member has a hole to contain the supported portion.

14. The mirror support mechanism according to claim 1, wherein
the first supporting members and the second supporting member are formed integrally.

15. The mirror support mechanism according to claim 1, wherein
the first supporting member has a structure allowing the mirror supporting portion to be moved in a radial direction of the reflecting mirror, and
the second supporting member has a structure allowing the supporting portion to be moved in the radial direction of the reflecting mirror.

16. An optical device comprising:
the mirror support mechanism according to claim 1; and
the reflecting mirror.

17. The optical device according to claim 16, wherein the supported portion is a protrusion having a cylindrical outer shape.

18. The optical device according to claim 17, wherein each of the three supported surfaces is a flat surface formed, on the protrusion, in parallel to the optical axis.

19. A mirror support mechanism to support a reflecting mirror, the reflecting mirror including a reflecting surface to reflect light and a supported portion being protrusion provided at a center of a rear surface being a surface of the reflecting mirror existing on the contrary side to the reflecting surface, a side surface of the supported portion including three supported surfaces provided with rotational symmetry of 120 degrees around an optical axis, the mirror support mechanism comprising:
three first supporting members having a hexagonal outer shape in which a side of a first length and a side of a second length are alternately located adjacent to each other in an optical axis perpendicular plane that is a plane perpendicular to the optical axis, each first supporting member including a mirror supporting portion being formed at a center of each side of the first length and being in contact with a corresponding one of the three supported surfaces to support the corresponding supported surface; and a second supporting member having a hexagonal outer shape in which a side of a third length and a side of a fourth length are alternately located adjacent to each other in the optical axis perpendicular plane, the second supporting member including three supporting portions and three connecting portions, the three supporting portions each being formed at a center of each side of the third length, and being connected to the side of the second length of the first supporting member to support the first supporting member, and the three connecting portions each formed at each side of the fourth length, and being connected to a structure member provided on the rear side of the reflecting mirror.

20. The mirror support mechanism according to claim 19, wherein
- the first supporting member includes two first beam portions each having one end connected to the mirror supporting portion and the other end connected to the supporting portion, and
- the second supporting member includes two second beam portions each having one end connected to the supporting portion and the other end connected to the connecting portions.

\* \* \* \* \*